US010285236B2

(12) United States Patent
Nelson et al.

(10) Patent No.: US 10,285,236 B2
(45) Date of Patent: May 7, 2019

(54) OPTOELECTRONIC DEVICE AND ADAPTIVE ILLUMINATION SYSTEM USING THE SAME

(71) Applicant: Lumileds LLC, San Jose, CA (US)

(72) Inventors: Erik Charles Nelson, San Jose, CA (US); Isaac Wildeson, San Jose, CA (US); Parijat Deb, San Jose, CA (US); Kenneth Vampola, Los Altos, CA (US)

(73) Assignee: Lumileds, LLC, San Jose, CA (US)

(*) Notice: Subject to any disclaimer, the term of this patent is extended or adjusted under 35 U.S.C. 154(b) by 0 days.

(21) Appl. No.: 15/948,642

(22) Filed: Apr. 9, 2018

(65) Prior Publication Data
US 2019/0082508 A1 Mar. 14, 2019

Related U.S. Application Data

(63) Continuation of application No. 15/699,573, filed on Sep. 8, 2017, now Pat. No. 9,974,135.

(51) Int. Cl.
*H05B 33/00* (2006.01)
*H05B 33/08* (2006.01)
*G01J 1/42* (2006.01)
*H05B 37/02* (2006.01)
*B60Q 1/14* (2006.01)

(52) U.S. Cl.
CPC ....... *H05B 33/0854* (2013.01); *B60Q 1/1423* (2013.01); *G01J 1/4204* (2013.01); *H05B 37/0218* (2013.01); *B60Q 2300/056* (2013.01); *B60Q 2300/42* (2013.01); *G01J 1/4228* (2013.01)

(58) Field of Classification Search
CPC ....... H05B 1/00; H05B 31/00; H05B 2203/00
See application file for complete search history.

(56) References Cited

U.S. PATENT DOCUMENTS

| 8,258,707 | B2 | 9/2012 | Van Der Veen et al. |
| 9,041,697 | B2 | 5/2015 | Soto |
| 9,847,446 | B2 | 12/2017 | Cagli et al. |
| 2006/0012986 | A1 | 1/2006 | Mazzochette et al. |
| 2010/0001300 | A1 | 1/2010 | Raring et al. |
| 2014/0028197 | A1 | 1/2014 | van de Ven |
| 2015/0219300 | A1 | 8/2015 | Kishi et al. |

(Continued)

FOREIGN PATENT DOCUMENTS

| JP | 4-026159 A | 1/1992 |
| JP | 4-085962 A | 3/1992 |

(Continued)

*Primary Examiner* — Monica C King
(74) *Attorney, Agent, or Firm* — Volpe and Koenig PC

(57) ABSTRACT

An automotive headlight is disclosed including: an optical unit including a plurality of optical elements, each optical element having a different central direction; a segmented light-emitting diode (LED) chip including a plurality of LEDs that are separated by trenches formed on the segmented LED chip and arranged in a plurality of sections, each section being aligned with a different respective optical element, and each section including at least one first LED and at least one second LED; and a controller configured to: apply a forward bias to each of the first LEDs, apply a reverse bias to each of the second LEDs, and change a brightness of the first LEDs in any section based on a signal generated by the second LED in that section.

20 Claims, 17 Drawing Sheets

(56) References Cited

U.S. PATENT DOCUMENTS

2017/0126944 A1  5/2017  Jagt et al.
2017/0253172 A1  9/2017  Canonne et al.

FOREIGN PATENT DOCUMENTS

| JP | 2008-300170 A | 12/2008 |
| JP | 2009-134877 A | 6/2009 |
| JP | 2009-187860 A | 8/2009 |
| JP | 2015-018612 A | 1/2015 |

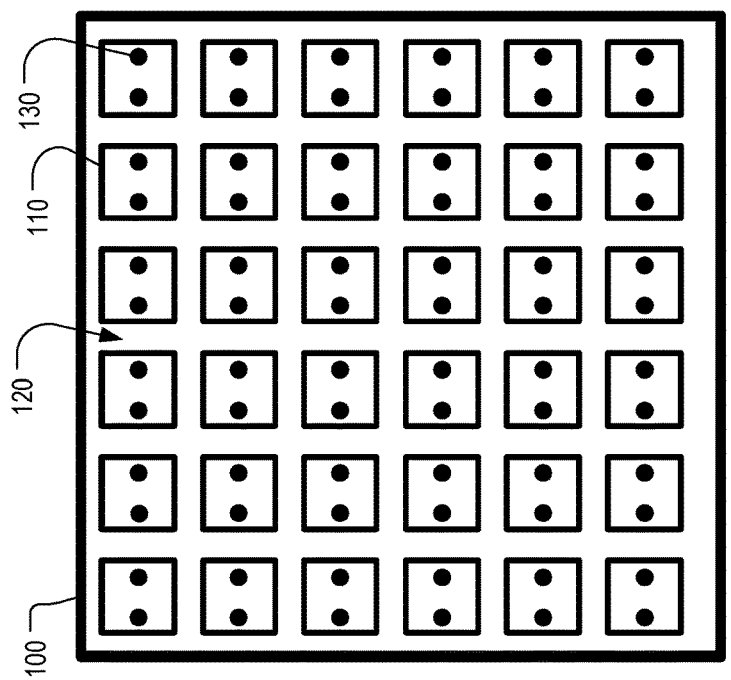
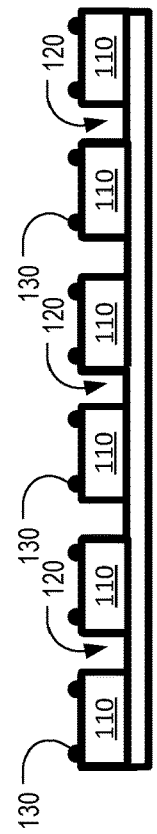
FIG. 2
FIG. 1

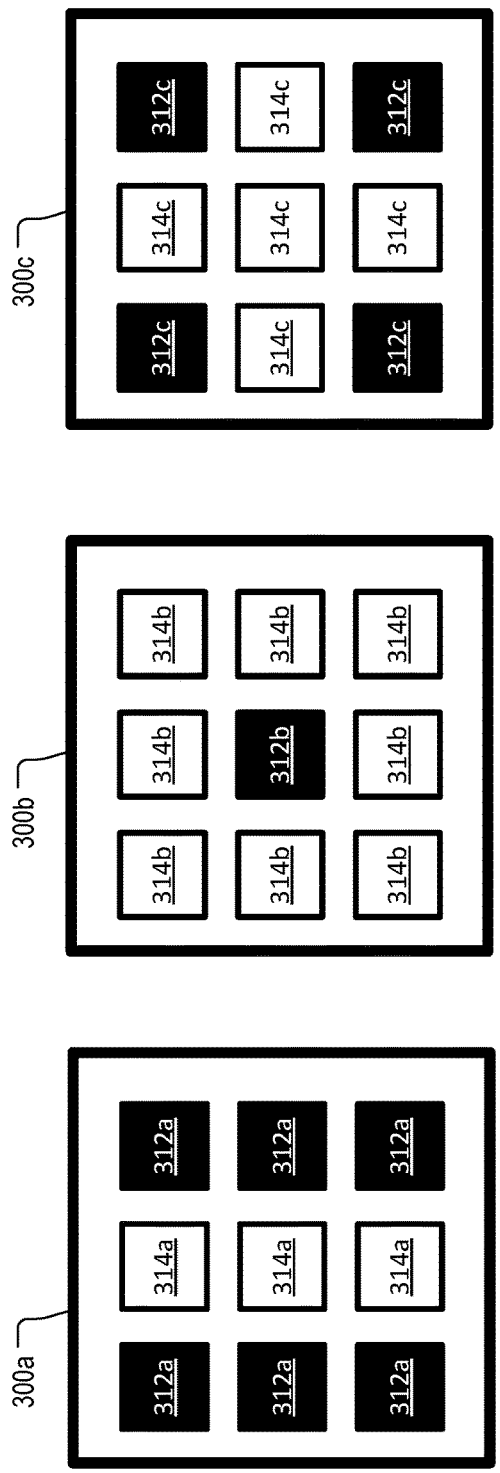

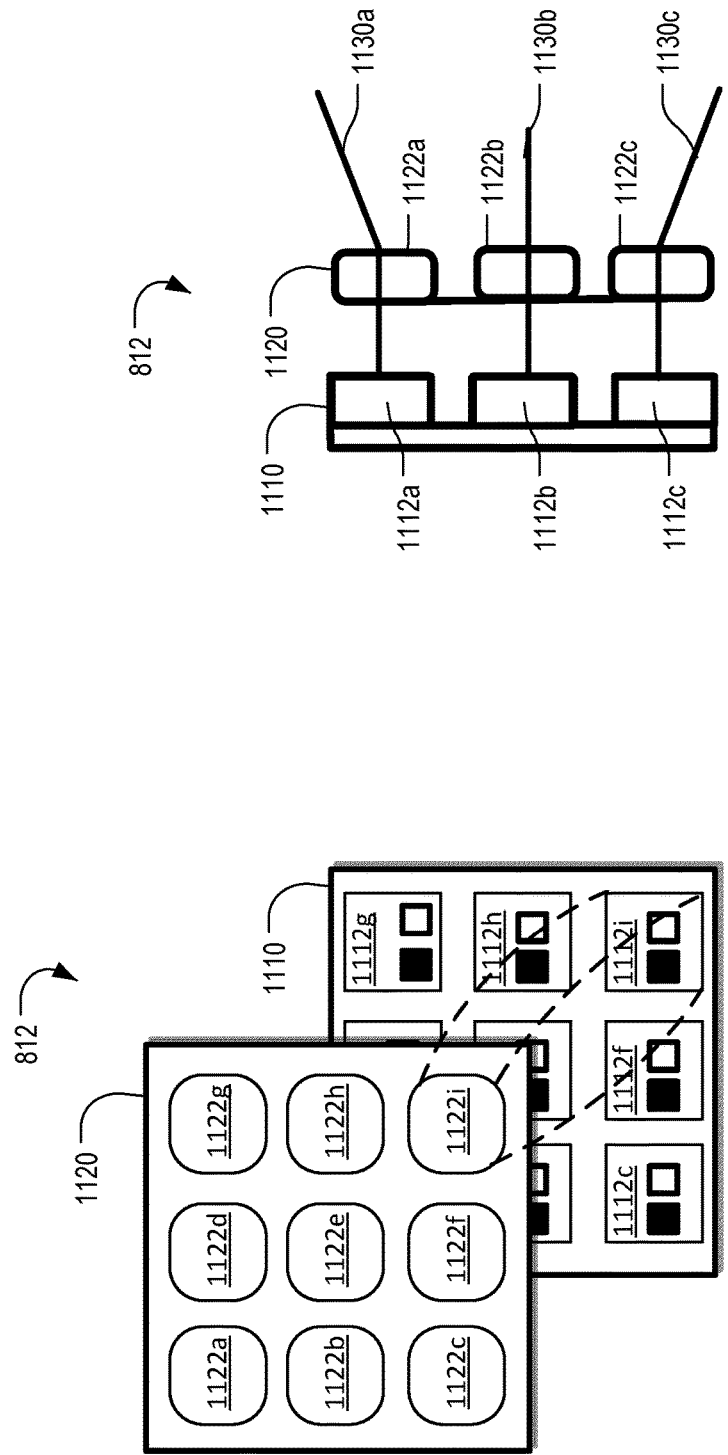

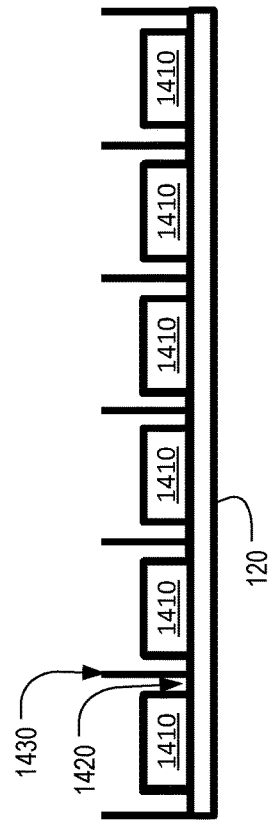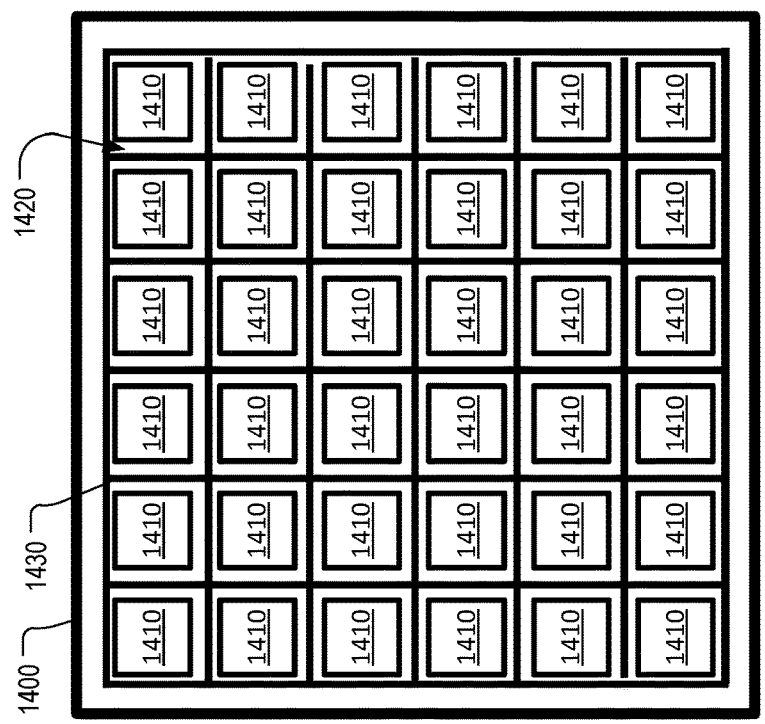
FIG. 14B
FIG. 14A

OPTOELECTRONIC DEVICE AND ADAPTIVE ILLUMINATION SYSTEM USING THE SAME

CROSS REFERENCE TO RELATED APPLICATIONS

This application is a continuation of U.S. patent application Ser. No. 15/699,573, filed Sep. 8, 2017, which is/are incorporated by reference as if fully set forth.

FIELD OF INVENTION

The present disclosure relates to light emitting devices in general, and more particularly, to an optoelectronic device and adaptive illumination system using the same.

BACKGROUND

Light emitting diodes ("LEDs") are commonly used as light sources in various applications. LEDs are more energy-efficient than traditional light sources, providing much higher energy conversion efficiency than incandescent lamps and fluorescent light, for example. Furthermore, LEDs radiate less heat into illuminated regions and afford a greater breadth of control over brightness, emission color and spectrum than traditional light sources. These characteristics make LEDs an excellent choice for various lighting applications ranging from indoor illumination to automotive lighting.

Accordingly, the need exists for improved solid-state lighting designs that leverage the advantages of LEDs over traditional light sources, to achieve greater robustness and increased functionality.

SUMMARY

According to aspects of the disclosure, an automotive headlight is disclosed including: an optical unit including a plurality of optical elements, each optical element having a different central direction; a segmented light-emitting diode (LED) chip including a plurality of LEDs that are separated by trenches formed on the segmented LED chip and arranged in a plurality of sections, each section being aligned with a different respective optical element, and each section including at least one first LED and at least one second LED; and a controller configured to: apply a forward bias to each of the first LEDs, apply a reverse bias to each of the second LEDs, and change a brightness of the first LEDs in any section based on a signal generated by the second LED in that section.

BRIEF DESCRIPTION OF THE DRAWINGS

The drawings described below are for illustration purposes only. The drawings are not intended to limit the scope of the present disclosure. Like reference characters shown in the figures designate the same parts in the various embodiments.

FIG. 1 is a schematic top-down view of an example of a segmented light emitting diode (LED) chip, according to aspects of the disclosure;

FIG. 2 is a schematic side view of an example of the segmented LED chip of FIG. 1, according to aspects of the disclosure;

FIG. 3A is a diagram illustrating an example of an operational pattern that can be imparted on a segmented LED chip, according to aspects of the disclosure;

FIG. 3B is a diagram illustrating another example of an operational pattern that can be imparted on a segmented LED chip, according to aspects of the disclosure;

FIG. 3C is a diagram illustrating yet another example of an operational pattern that can be imparted on a segmented LED chip, according to aspects of the disclosure;

FIG. 11A is a schematic exploded view of a headlight that can be used in the adaptive automotive lighting system of FIG. 8, according to aspects of the disclosure;

FIG. 11B is a schematic side view of the headlight of FIG. 11A, according to aspects of the disclosure;

FIG. 14A is schematic top-down view of an example of a segmented LED chip that is optimized to avoid crosstalk between emitter LEDs and detector LEDs situated on the chip's die, according to aspects of the disclosure;

FIG. 14B is schematic side view of the segmented LED chip of FIG. 14A, according to aspects of the disclosure;

DETAILED DESCRIPTION

Figure 4:
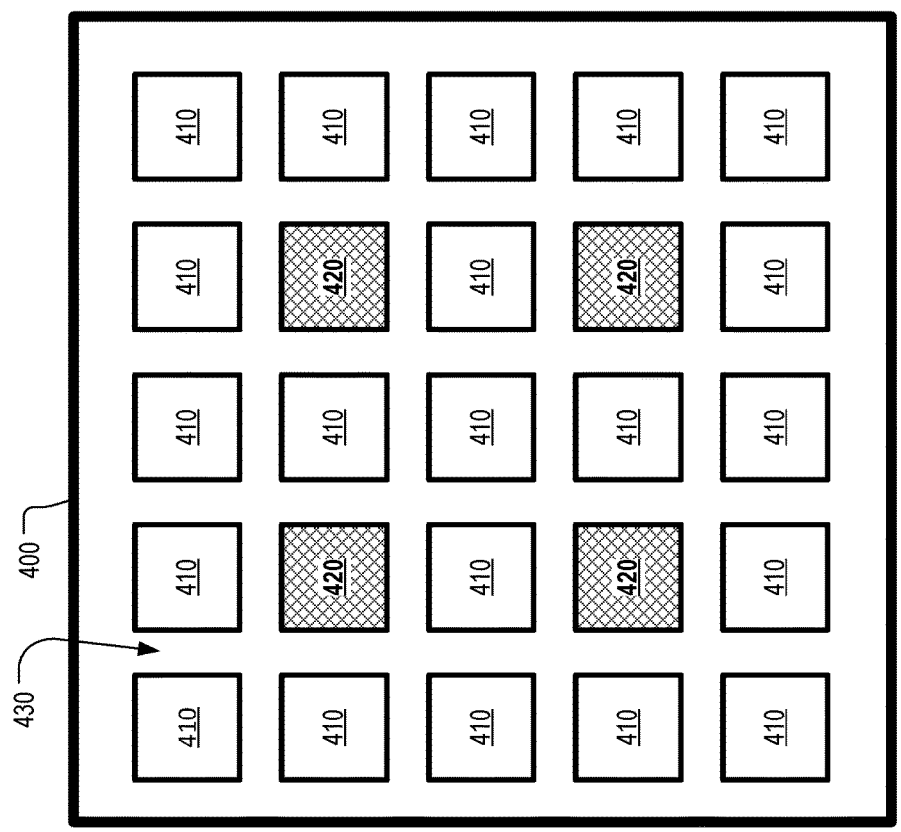
FIG. 4 is a schematic top-down view of another example of a segmented LED chip, according to aspects of the disclosure.

According to aspects of the disclosure, a segmented light-emitting diode (LED) chip is disclosed that includes a plurality of LEDs. Each LED on the segmented LED chip is provided with a pair of contacts which permits the LED to be biased separately from the rest. As a result, some of the LEDs in the segmented LED chip can be used as detectors for detecting ambient light while others are can be used as emitters. Any given LED in the segmented LED chip may be used as an emitter when forward bias is applied to that LED. Similarly, any LED in the segmented LED chip may be used as a detector when a reverse bias is applied to that LED.

According to aspects of the disclosure, some of the LEDs in the segmented LED chip may be optimized for use as detectors. For example, any of the optimized LEDs may be provided with a filter structure for narrowing its absorption band. As another example, any of the optimized LEDs may be further doped by ion implantation for example to shift and/or expand that LEDs absorption band. As yet another example, any of the optimized LEDs may be both provided with a filter structure and additionally doped to fine-tune that LED's absorption band.

According to aspects of the disclosure, the segmented LED chip can be used to build an improved adaptive lighting system. Traditional adaptive lighting systems include light emitters and light detectors that are located on separate chips. However, because the segmented LED chip includes both light emitters and light detectors on the same die, the number of parts that need to be included in the improved adaptive lighting system is reduced along with the system's sensor footprint.

According to aspects of the disclosure, the segmented LED chip may permit emitters and light detectors to share the same optics. Because emitters and light detectors are situated in close proximity to one another on the chip's die, they can both fit under the same lens (or another type of optical unit), without the need for optical alignment. As can be readily appreciated, fitting the emitters and detectors under the same lens eliminates the need for periodic optical alignments that could be necessary if the emitters and light detectors were to use separate lenses.

According to aspects of the disclosure, the segmented LED chip may permit fine illumination control not found in traditional lighting systems. Because emitters and light detectors are situated in close proximity to one another on the chip's die, different emitter-detector pairs can fit under different lenses in a lens array. Each lens in the array may be configured to guide light emitted from its respective emitter in a different central direction. Additionally, each lens may be configured to pass through, to its respective light detector, light that is incident on the lens from the lens's respective central direction. Thus, each lens's respective light detector may be effectively configured to measure ambient lighting conditions that are predominantly associated with the lens's respective emitter. This in turn can permit an emitter LED that is directed towards an area that is over-illuminated to be dimmed without changing the brightness of other LEDs in the segmented LED chip that are oriented towards areas that are not over-illuminated.

According to aspects of the disclosure, an apparatus is disclosed comprising: a segmented light-emitting diode (LED) chip including a plurality of LEDs that are separated by trenches formed on the segmented LED chip, each LED having a respective emission band and a respective absorption band, wherein the plurality of LEDs includes one or more first LEDs and one or more second LEDs, and at least one of the second LEDs is configured to have a different absorption band than any of the first LEDs as a result of processing performed on the segmented LED chip after the trenches are formed.

According to aspects of the disclosure, an apparatus is disclosed comprising: a segmented light-emitting diode (LED) chip including a plurality of LEDs that are separated by trenches formed on the segmented LED chip; and a controller configured to: apply a forward bias to a first LED and a second LED in the segmented LED chip; and change a brightness of each of the first LED and the second LED by different amounts, wherein the brightness of the first LED is changed based on a first signal generated by a reverse-biased LED in the segmented LED chip and the brightness of the second LED is changed based on a second signal that is generated concurrently with the first signal by another reverse-biased LED in the segmented LED chip.

According to aspects of the disclosure, an apparatus is disclosed comprising: a segmented light-emitting diode (LED) chip including a plurality of LEDs that are separated by trenches formed on the segmented LED chip; and a controller configured to: apply a forward bias to one or more first LEDs in the plurality; apply a reverse bias to one or more second LEDs in the plurality; and change a brightness of a given first LED based on a signal generated by one or more given second LEDs that are co-located with the given first LED.

Examples of different adaptive lighting systems will be described more fully hereinafter with reference to the accompanying drawings. These examples are not mutually exclusive, and features found in one example can be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be understood that these terms are intended to encompass different orientations of the element in addition to any orientation depicted in the figures.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

FIGS. 1 and 2 depict an example of a segmented LED chip 100, according to aspects of the disclosure. Specifically, FIG. 1 is a top-down view of the segmented LED chip 100 and FIG. 2 is side view of the segmented LED chip 100. The segmented LED chip 100 includes a single LED die that is divided into multiple segments, each of which is configured to operate separately from the rest. More particularly, in the present example, the segmented LED chip 100 includes a plurality of LEDs 110 that are separated by trenches 120 formed on the chip's die. Each of the LEDs 110 in the segmented LED chip 100 is provided with a respective pair of contacts 130 that permit that LED to be biased separately from the rest.

In some implementations, the segmented LED chip 100 may be of similar or identical size to a standard LED, and each LED 110 (e.g., a segment) can be smaller than the typical LED. For example, a standard 1 mm×1 mm LED chip could be made up of 5×5 LEDs (or segment) of 200 um×200 um each. The size depends on the separation between the segments (e.g., LEDs), which is dictated by the manufacturing capabilities. According to the present example, the LEDs 110 are electrically isolated from one another, for example by dry etching the die of the segmented LED chip 100 down to an insulating substrate or submount to sever any electrical connection between the LEDs 110. Contacts would be deposited on each LED 110 separately in a well-known fashion.

Because the LEDs are capable of being biased separately, the segmented LED chip 100 can be operated as an emitter and detector at the same time by forward-biasing some of the LEDs 110 while reverse-biasing others. As is well-known in the art, when a forward bias is applied to an LED, that LED emits light and is said to operate as an emitter (or in emitter mode) under the nomenclature of the present specification. Similarly, when a reverse bias is applied to a given LED that LED operates as a photodetector and is said to operate as a detector (or in detector mode) under the nomenclature of the present specification. Furthermore, because each of the LEDs 110 in the segmented LED chip 100 can be biased independently, the location, as well as the relative numbers, of the emitters and detectors in the chip can be set selectively by any control circuit that drives the segmented LED chip 100. As is further discussed below, a given configuration of emitters and detectors in a segmented LED chip can be referred to as an "operational pattern" that is imparted on that segmented LED chip.

FIGS. 3A, 3B, and 3C illustrate examples of different operational patterns that can be imparted on a segmented LED chip, according to aspects of the disclosure. More particularly, FIG. 3A illustrates an example of a segmented LED chip 300a that is configured to operate in accordance with a first operational pattern. As illustrated in this pattern, LEDs 312a are reverse-biased and configured to operate as detectors, while LEDs 314a are forward-biased and configured to operate as emitters. FIG. 3B illustrates an example of a segmented LED chip 300b that is configured to operate in accordance with a second operational pattern. As illustrated, according to the second operational pattern, LEDs 312b are reverse-biased and configured to operate as detectors, while LEDs 314b are forward-biased and configured to operate as emitters. FIG. 3C illustrates an example of a segmented LED chip 300c that is configured to operate in accordance with a third operational pattern. As illustrated, according to the third operational pattern, LEDs 312c are reverse-biased and configured to operate as detectors, while LEDs 314c are forward-biased and configured to operate as emitters.

In some aspects, the number of LEDs that are operated as detectors can vary depending on the amount of sensitivity needed. If greater sensitivity is needed, more LEDs in a given segmented LED chip can be operated as detectors. By contrast, if a reduced sensitivity is needed, fewer of the LEDs in the given segmented LED chip can be used as detectors. Additionally or alternatively, in some implementations, all LEDs in a segmented LED chip can be configured to operate as emitters (e.g., put in forward bias). Additionally or alternatively, in some implementations, all LEDs in a segmented LED chip can be configured to operate as detectors (e.g., biased in the reverse direction).

In some implementations, the LEDs on a segmented LED chip can be configured to provide transient voltage suppression (TVS). In instances in which it is desirable to operate all LEDs in a segmented LED chip as emitters, one LED may nevertheless be kept in the opposite polarity (e.g., biased in the reverse direction) to provide TVS. In instances in which it is desirable to operate all LEDs in a segmented LED chip as detectors, one LED may nevertheless be kept in the opposite polarity (e.g., biased in the forward direction) to provide TVS.

In some aspects, some of the LEDs in a segmented LED chip can be optimized to function as detectors. FIG. 4 is a top-down view of a segmented LED chip 400 which includes LEDs 410 and 420 separated by trenches 430 formed on the chip's die. Each of LEDs 410 and 420 has a respective absorption band and a respective emission band. However, the absorption band of any of the LEDs 420 is different from the absorption band of each of the LEDs 410. For example, any of the LEDs 420 can have an absorption band that is wider than the absorption band of each of the LEDs 410. As another example, any of the LEDs 420 may have an absorption band that is shifted with respect to the absorption band of any of the LEDs 410. In some aspects, the difference between the absorption bands of the LEDs 410 and 420 may be the result of fine-tuning the LEDs 420 to fit a particular application, such as detecting light emitted by halogen light sources, which the LEDs 410 may not be able to detect well when used as detectors.

Any of the LEDs 420 may start as a structure that is identical to any of the LEDs 410, which is further modified by means of ion implantation for example after the trenches 430 are formed to produce the LED 420. As a result of the ion implantation, additional atoms and/or defects (e.g., vacancies, interstitials, substitutionals, etc.) may be present in the crystal lattices of the LEDs 420 that are not found in the crystal lattices of the LEDs 410. Those additional atoms and/or defects create deep level traps within the LED active region bandgap, and these deep level traps act as lower energy (i.e., longer wavelength) absorption centers which ultimately result in the LEDs 420 having a different absorption band than the LEDs 410. In some implementations, any of the LEDs 420 may include a greater concentration of atoms of a given implanted element (e.g., iron, phosphorus, arsenic, antimony, bismuth) or resulting point defect (e.g., vacancies, interstitials, etc.) than each of the LEDs 410. For example, the atoms of the given element may be present in lower concentrations in the LEDs 410 or not present at all. Additionally or alternatively, in some implementations, any of the LEDs 420 may include a greater concentration of point defects than each of the LEDs 410.

Although in the present example, all LEDs 420 have the same absorption band, in some implementations at least some of the LEDs 420 may have different absorption bands. For example, the segmented LED chip 400 may include a first LED 420 that is optimized to detect light emitted from halogen headlights, a second LED 420 that is optimized to detect light emitted from xenon headlights, and a third LED 420 that is optimized to detect light from incandescent headlights. In some aspects, each of the first, second, and third LEDs 420 (or at least two of them) may be doped with a different element and/or in different amounts to achieve the variation in absorption bands.

In some implementations, the absorption band of the second LEDs can be altered by changing the magnitude of reverse bias applied while serving as a detector. In III-nitride LEDs for example, an increase in reverse bias magnitude first shifts the absorption band to shorter wavelengths as quantum well bands flatten as applied bias counters the polarization-induced electric fields within the active region. As the reverse bias magnitude continues to increase, the absorption band shifts to longer wavelengths.

Figure 5:
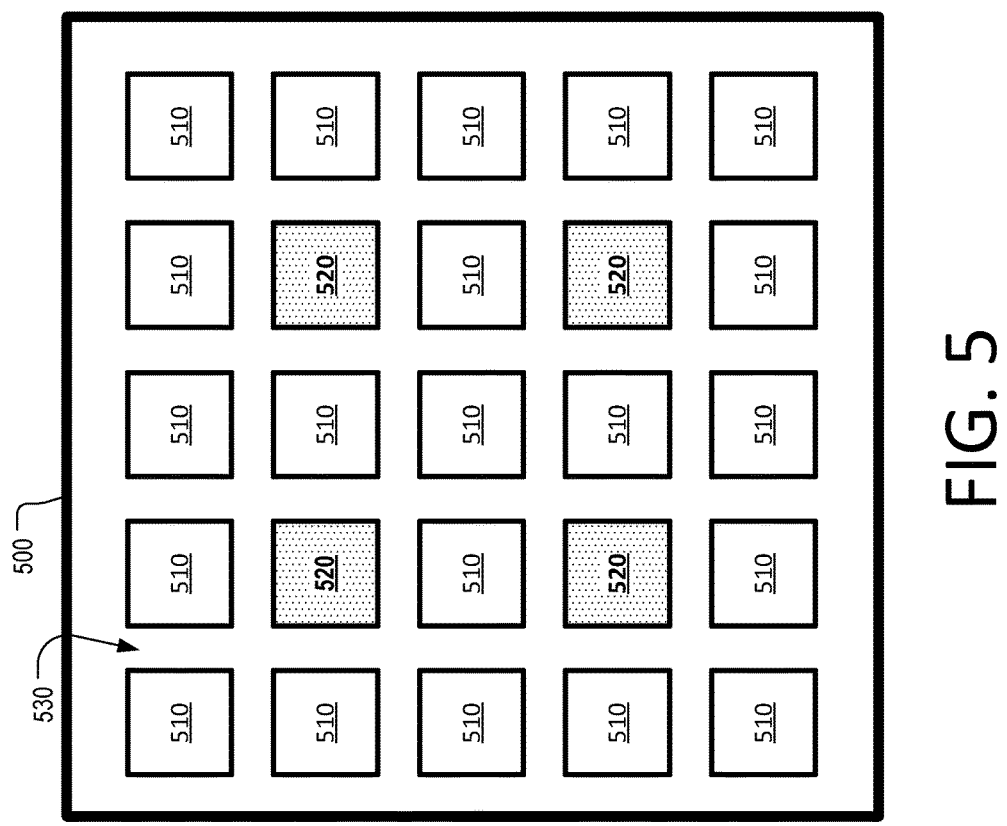
FIG. 5 is a schematic top-down view of another example of a segmented LED chip, according to aspects of the disclosure.

FIG. 5 depicts another example of a segmented LED chip 500, which includes LEDs that are optimized for use as detectors, according to aspects of the disclosure. The segmented LED chip 500 includes LEDs 510 and LEDs 520 that are separated by trenches 530 formed on the chip's die. Each of the LEDs 520 is provided with a filter structure formed on one or more of its respective light emitting surface(s). As a result of being provided with a filter structure, any of the LEDs 520 may have a narrower absorption band than each of the LEDs 510. In some aspects, the difference between the absorption bands of the LEDs 510 and 520 may be the result of fine-tuning the LEDs 520 to fit a particular purpose.

In some implementations, the respective filter structures of the LEDs 520 may be formed after the trenches of the segmented LED chip 500 have been etched. Each of the LEDs 520 may start as a base structure (e.g., an LED) that is substantially identical to the LEDs 510, which is further processed to include a respective filter structure on one or more of its surfaces. The respective filter structures of the LEDs 520 may be deposited using any suitable type of technique, such as plasma enhanced chemical vapor deposition, atomic layer deposition or sputtering for example. The respective filter structures may be formed of any suitable type of material such as dielectric layers or stacks of dielectric layers for forming distributed Bragg reflectors (DBRs) that create high reflectivity of certain wavelengths of light not desired to impinge on the LED, for example. The present disclosure is not limited to any particular type of process for depositing the filter structure and/or composition.

As noted above, each of the LEDs 520 may be formed by covering a base structure (e.g., an LED) that is substantially identical to one of the LEDs 510 with a respective filter structure. In some aspects, the filter structure of a given LED 520 may be configured to have a transmittance band that only partially overlaps with the absorption band of the given LED's 520 base structure. For example, the filter structure of the given LED 520 may have a transmittance band having a respective lower bound and a respective upper bound. Similarly, the base structure of the given LED 520 (or any of the LEDs 510) may have an absorption band having a respective lower bound and a respective upper bound. In some aspects, the lower bound of the transmittance band of the filter structure may be greater than the lower bound of the absorption band of the base structure (or any of the LEDs 510). Additionally or alternatively, the upper bound of the transmittance band of the filter structure may be lower than the upper bound of the absorption band of the base structure of the given LED 520 (or any of the LEDs 510).

Figure 6:
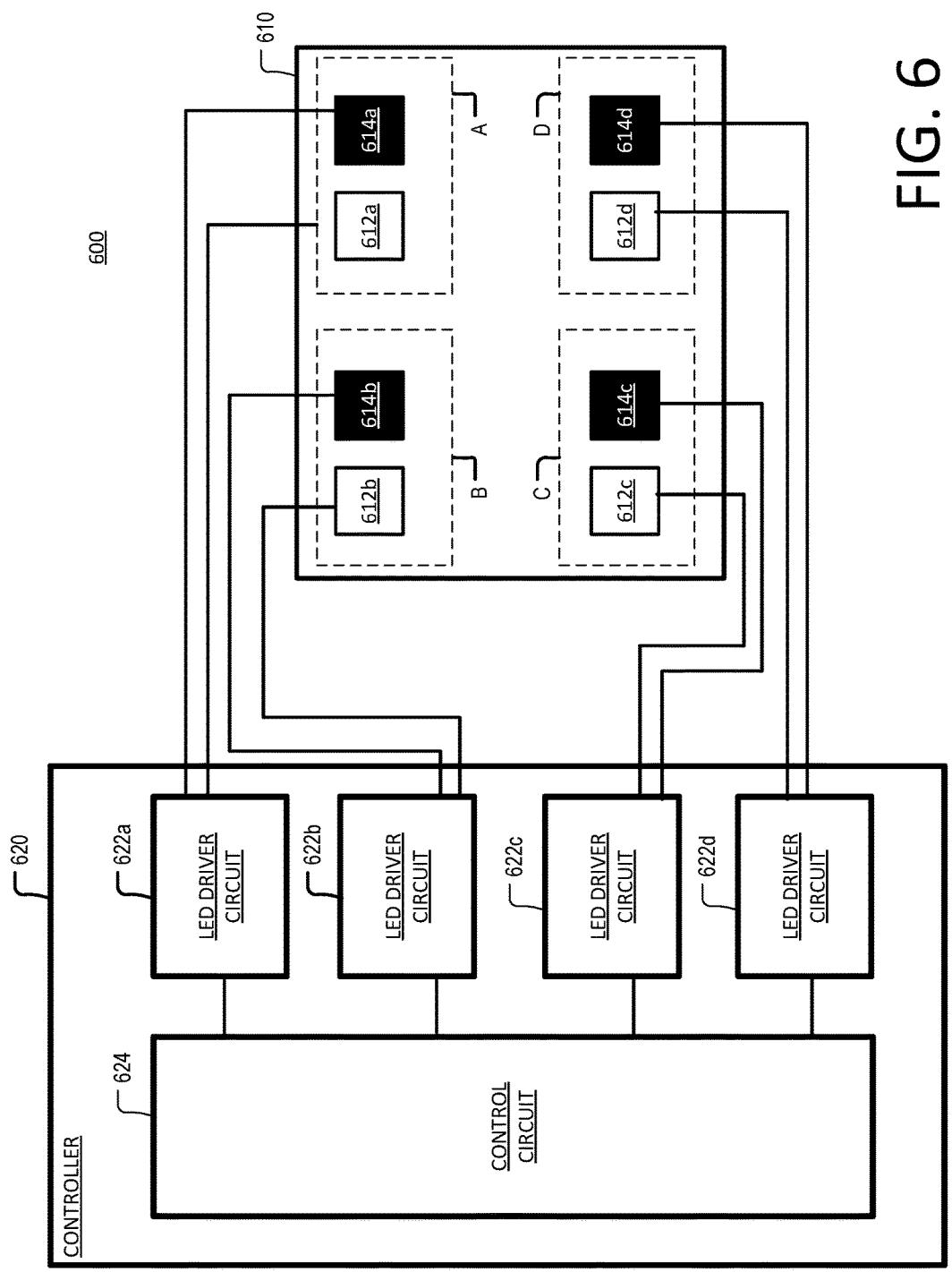
FIG. 6 is a schematic diagram of an example of an adaptive lighting system, according to aspects of the disclosure.

FIG. 6 is a schematic diagram of an example of an adaptive lighting system 600, according to aspects of the disclosure. The adaptive lighting system 600 includes a segmented LED chip 610 and a controller 620, as shown. The controller 620 includes driver circuits 622a-d and a control circuit 624.

Each of the driver circuits 622a-d is coupled to a different group of LEDs on the segmented LED chip 610. For example, the driver circuit 622a is coupled to LEDs 612a and 614a, which are part of group A. The driver circuit 622b is coupled to LEDs 612b and 614b, which are part of group B. The driver circuit 622c is coupled to LEDs 612c and 614c, which are part of group C. The driver circuit 622d is coupled to LEDs 612d and 614d which are part of group D. According to the present example, each of LEDs 612a-d is configured to operate as an emitter by applying a forward bias to it. Furthermore, according to the present example, each of LEDs 614a-d is configured to operate as a detector by applying a reverse bias to it. Thus, each of the driver circuits 622a-d is connected to an emitter LED and a detector LED. Although in the present example each of groups A-D includes only one emitter and one detector, alternative implementations are possible in which any of groups A-D includes multiple emitters and/or multiple detectors. For example, any of groups A-D may include any number of emitters (e.g., 1, 5, 20, 30, etc.). Similarly, any of groups A-D may include any number of detectors (e.g., 1, 5, 20, 30, etc.) For instance, in some implantations, any of groups A-D may include one detector and five emitters. Thus, in some implementations, the emitters and detectors need not be matched in pairs.

According to aspects of the disclosure, driver circuit 622a may be configured change the brightness of the LED 612a based on a signal generated by the LED 614b. In some implementations, changing the brightness of the LED 612a may include increasing the brightness of the LED 612a, decreasing the brightness of the LED 612a (e.g., dimming the LED 612a), turning on the LED 612a, and turning off the LED 612a. Alternatively, in some implementations, changing the brightness of the LED 612a may include only increasing the brightness of the LED 612a and decreasing the brightness of the LED 612a (e.g., dimming the LED 612a). According to the present example, the LED 612a may be considered switched off if it remains turned off for a period that is longer than the off-period of a pulse-width modulation (PWM) wave used to drive the LED 612a when the LED 612a is energized. For example, the LED 612a may be considered to be switched off if it is not supplied with power for a duration that is longer than the sum of the on-period and the off-period of the PWM wave. As another example, the LED 612a may be considered to be switched off if it is not supplied with power for 1 second or longer. In some implementations, increasing the brightness of the LED 612a may include increasing the current supplied to the LED 612a. Additionally or alternatively, in some implementations, decreasing the brightness of the LED 612a may include decreasing the current supplied to the LED 612a without completely shutting it off. Additionally or alternatively, turning on the LED 612a may include starting to supply current to the LED 612a when the LED 612a is not energized.

In some implementations, the driver circuit 622a may change the brightness of the LED 612a in accordance with the amount of light that is incident on the LEDs in group A. For example, when the signal generated by the LED 614a indicates that a large amount of light is incident on the LEDs in group A, the driver circuit 622a may decrease the brightness of the LED 612a. Alternatively, when the signal generated by the LED 614a indicates that a low amount of light is incident on the LEDs in group A, the driver circuit 622a may increase the brightness of the LED 612a. Thus, according to the present example, the driver circuit 622a implements an adaptive lighting feature that is local to a group of LEDs and/or a portion of the segmented LED chip 610.

In some implementations, the driver circuit 622a may decrease the brightness of the LED 612a when the signal generated by the LED 614a crosses a first threshold. Additionally or alternatively, the driver circuit 622a may increase the brightness of the LED 612a when the signal generated by the LED 614a crosses a second threshold. Additionally or alternatively, the amount by which the brightness of the LED 612a is decreased or increased may be proportional to a change in the value of the signal generated by the LED 614a. Thus, in some implementations, the brightness of the LED 612a can be adjusted continuously, rather than in discrete steps.

In some implementations, the LED 614a may be continuously operated as a detector. Alternatively, in some implementations, the LED 614a may be operated as both a detector and an emitter. For example, the bias of the LED 614a may be periodically switched by the driver circuit 622a from forward to reverse to take a reading, and then returned to forward. (E.g., see FIG. 13). The switching of the bias of the LED 614a may occur very rapidly (e.g. <10 ns) to allow for light collection. In some implementations, the bias of the LED 614a may be switched at a very high frequency, so that the changes in the state of the LED 614a are imperceptible to the human eye. According to the present example, the LEDs 614b-d may be operated in a similar manner by their respective driver circuits.

Each of the driver circuits 612b-c may operate in a manner similar to the driver circuit 622a. More particularly, the driver circuit 622b may be any suitable type of circuit that is configured to change the brightness of the LED 612b based on a signal that is at generated by the LED 614b. The driver circuit 622c may be any suitable type of circuit that is configured to change the brightness of the LED 612c based on a signal that is generated by the LED 614c. And the driver circuit 622d may be any suitable type of circuit that is configured to change the brightness of the LED 612d based on a signal that is generated by the LED 614d.

The control circuit 624 may include a field-programmable gate array (FPGA), an application-specific integrated circuit (ASIC), a processor, a memory, and/or any other suitable type of circuitry that is configured to change the state of any of driver circuits 612a-d. For example, changing the state of a given driver circuit may include causing the given driver circuit to increase or decrease the bias that is applied to a particular detector LED. As another example, changing the state of a given driver circuit may include causing the driver circuit to increase or decrease the amount of current supplied to a particular emitter LED. Thus, in some implementations, the control circuit 624 may be configured to set a relationship between the signal produced by a given detector LED(s) and the light output of associated emitter LED(s) that is subsequently enforced by a driver circuit that is connected to the given detector LED(s) and their associated emitter LED(s).

In some implementations, the control circuit 624 may be omitted from the controller 620. In such instances, each of LED groups A-D may be controlled by a separate driver circuit, completely independently of the rest.

In the present example, the controller 620 is configured to control an LED matrix including a single segmented LED chip. However, in some implementations, the controller may be configured to control an LED matrix that includes a plurality of segmented LED chips and/or one or more non-segmented LED chips. For example, the controller 620 may be configured to control an LED matrix including four segmented LED chips, such that each of the driver circuits 622a-d is connected to a different one of the segmented LED chips.

In the present example the LEDs in groups A-D are hardwired to different driver circuits. However, in some implementations, the controller 620 may be provided with a switching fabric that enables the control circuit 624 to selectively assign control over the LEDs in the segmented LED chip 610 to any of the driver circuits. For example, the switching fabric may enable the control circuit 624 to connect all LEDs in the segmented LED chip 610 to a particular driver circuit. Alternatively, the switching fabric may enable the control circuit 624 to connect half of the LEDs in the segmented LED chip 610 to one driver circuit, while connecting the other half to another driver circuit. Stated succinctly, the switching fabric may permit the control circuit 624 to dynamically group the LEDs in the segmented LED chip 610 into any number of groups, and assign each group to a different driver circuit.

Figure 7:
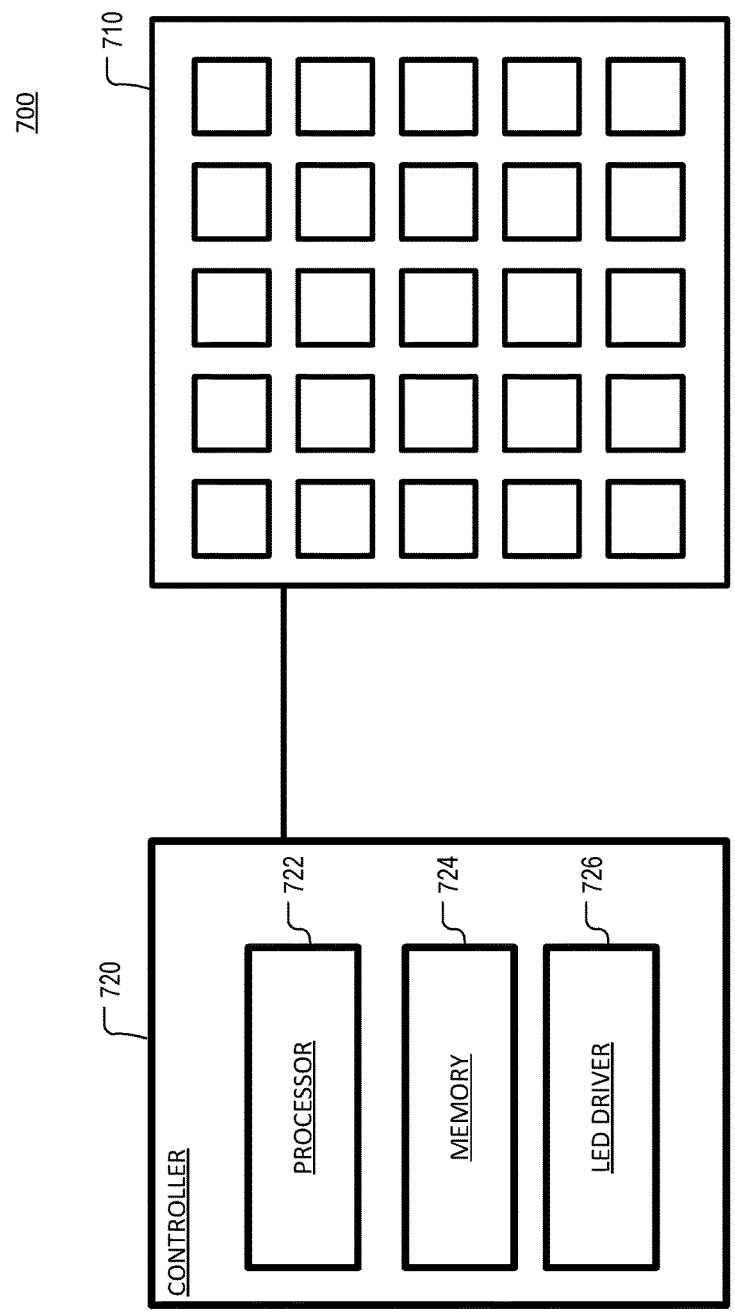
FIG. 7 is a schematic diagram of another example of an adaptive lighting system, according to aspects of the disclosure.

FIG. 7 is a diagram of an example of an adaptive lighting system 700, according to aspects of the disclosure. The adaptive lighting system 700 includes a segmented LED chip 710 coupled to a controller 720. The controller 720 includes a processor 722, a memory 724, and a driver 726. The processor 722 may include any suitable type of processor, such as one or more of an application-specific integrated processor (ASIC), a field-programmable gate array (FPGA), a general-purpose processor (e.g., an ARM-based processor, an x86-based processor, a MIPS processor, etc.). The memory 724 may include any suitable type of volatile and non-volatile memory, such as DRAM, EEPROM, flash memory, a solid-state drive (SSD), and a hard drive. The driver 726 may include any suitable type of electronic circuit configured to bias and/or supply current to any of the LEDs in the segmented LED chip 710.

In some implementations, the controller 720 may configure some of the LEDs in the segmented LED chip 710 to operate as emitters by applying a forward bias to those LEDs. Furthermore, the controller 720 may configure others of the LEDs in the segmented LED chip 710 to operate as detectors, by reverse-biasing those LEDs. Afterwards, the controller 720 may change the brightness of any of the emitter LEDs based on signal(s) generated by one or more the detector LEDs, as discussed with respect to FIGS. 15-17 below.

In some implementations, the controller 720 may be configured to address each of the LEDs in the segmented LED chip 710 individually. For example, the controller 720 may be configured to change the magnitude and/or polarity of the bias of any LED in the segmented LED chip 710 independently from the rest. As another example, the controller 720 may be configured to increase or decrease the current supplied to any LED in the segmented LED chip 710 without changing the supply of current to any of the other LEDs in the segmented LED chip 710. As another example, the controller 720 may be configured to detect a signal that is generated by one of the LEDs in the segmented LED chip 710. Although in the present example the controller 720 is used to control an LED matrix consisting of a single segmented LED chip, alternative implementations are possible in which the controller 720 is configured to control any suitable type of LED matrix, such as a matrix including multiple segmented LED chips, and/or a matrix including one or more non-segmented LED chips.

Figure 8:
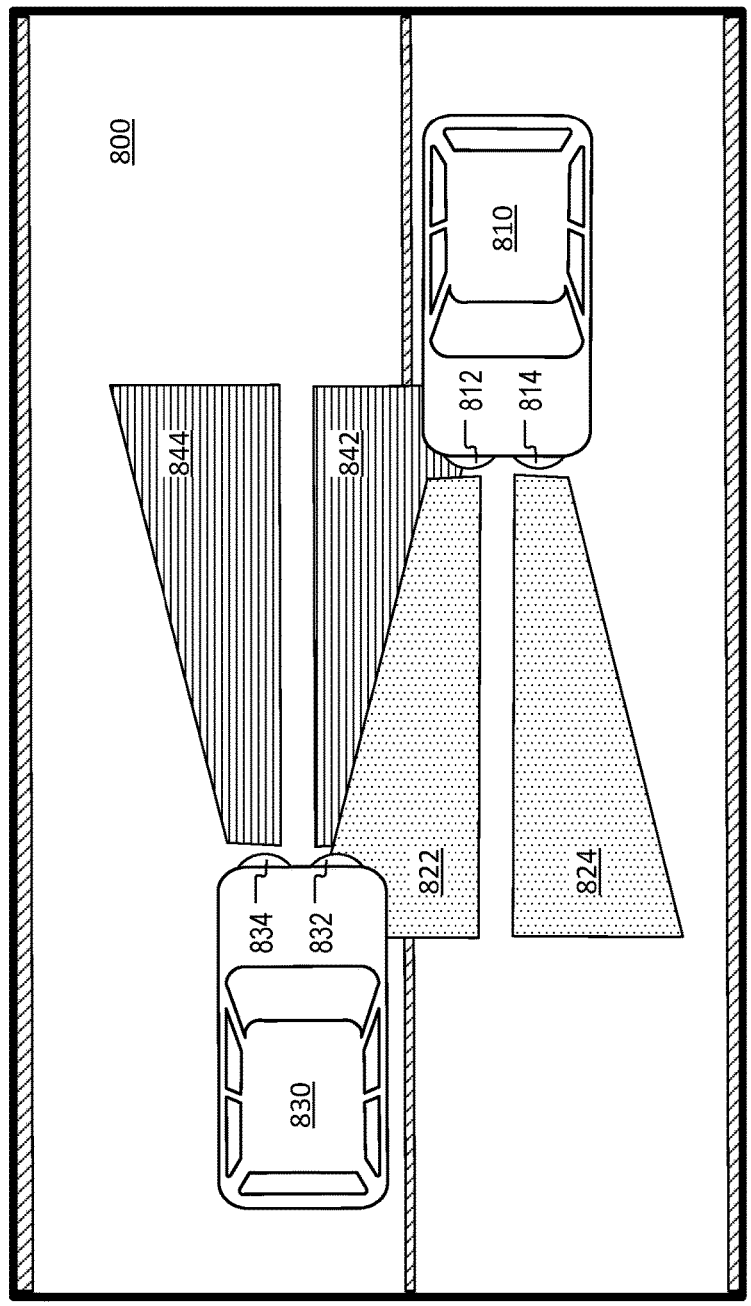
FIG. 8 is a diagram illustrating an example of the operation of an adaptive automotive lighting system that uses a segmented LED chip, according to aspects of the disclosure.

FIG. 8 is a diagram illustrating an example of the operation of an adaptive automotive lighting system that uses a segmented LED chip, according to aspects of the disclosure. In this example, vehicles 810 and 830 are travelling in opposite directions on a road 800. Each of the headlights of the vehicles 810 and 830 includes a segmented LED chip (or another type of LED matrix) that is driven by a controller configured to take an adaptive action when oncoming traffic is encountered.

According to the present example, the vehicle 810 includes headlights 812 and 814 which are turned on to illuminate a space 822 and a space 824, respectively. The space 822 may include a corresponding section of the road 800 ahead of the vehicle 810, as well as the space above it. Similarly, the space 824 may include another corresponding section of the road 800 ahead of the vehicle 810, as well as the space above it. The vehicle 830 includes headlights 832 and 834 which are turned on to illuminate a space 842 and a space 844, respectively. The space 842 includes a corresponding section of the road 800 ahead of the vehicle 830, as well as the space above it. Similarly, the space 844 may include another corresponding section of the road 800 ahead of the vehicle 830, as well as the space above it.

In some implementations, the headlights 812 and 814 may be operated by the same controller that is configured to take various adaptive actions on behalf of the vehicle 810, as discussed further below. Additionally or alternatively, the headlights 812 and 814 maybe operated by different respective controllers. Accordingly, it will be understood that the present disclosure is not limited to any specific system topology of the adaptive lighting systems of vehicles 810 and 830.

Figure 9:
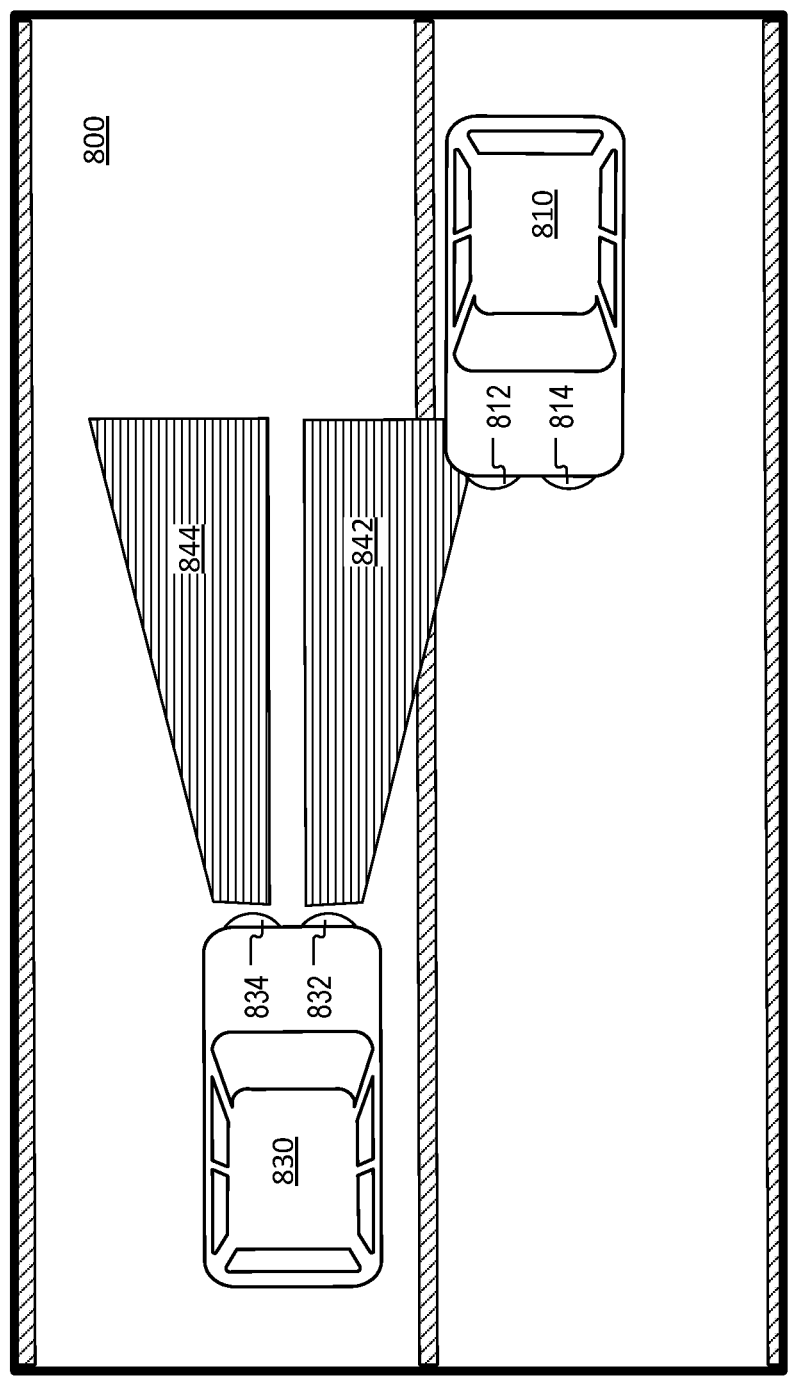
FIG. 9 is a diagram illustrating an example of an adaptive action that could be taken by the adaptive automotive lighting system of FIG. 8, according to aspects of the disclosure.

FIG. 9 is a diagram illustrating an example of an adaptive action that could be taken by the adaptive automotive lighting system of FIG. 8 when oncoming traffic is encountered, according to aspects of the disclosure. More particularly, when vehicle 830 enters the space 822, the headlight 812 detects light emitted from the headlight 832 of the vehicle 830 by using one or more detector LEDs in the headlight's segmented LED chip. In response, the headlights 812 and 814 are turned off to avoid blinding the driver of the vehicle 830. When the vehicles 810 and 830 pass each other, the light emitted from the headlight 834 no longer illuminates the detector LEDs in the headlight 812 and the headlights 812 and 814 of vehicle 830 are turned back on. Although in the present example only one of the vehicles 810 and 830 turns its headlights off, in some implementations both vehicles may turn their headlights off (or dim them). Additionally or alternatively, in some implementations, any of the vehicles 810 and 830 may turn off (or dim) only some of the LEDs in each headlight.

According to aspects of the disclosure, a blinking condition may occur when both vehicles 810 and 830 enter a cycle in which they see oncoming light sources and turn off (or just dim) their headlights, after which both vehicles realize that there is no light impinging on them anymore and turn their headlight(s) back on. In some implementations, the vehicles 810 and 830 may prevent the blinking condition from occurring by exchanging communications for determining which one of them will turn its headlights off (or just dim them). For example, each of the vehicles 810 and 830 may transmit to the other a message instructing to keep its headlights off (or dimmed) for a predetermined period of time (e.g., 30 seconds). The message may be transmitted using the vehicle's headlights, a radio transceiver, and/or any other suitable type of device.

In some aspects, the vehicle 810 may use a segmented LED chip that is part of the headlight 812 as a transceiver for exchanging communications with the vehicle 830 to determine which vehicle will turn its headlights off. Similarly, the vehicle 830 may use a segmented LED chip that is part of the headlight 832 as a transceiver for exchanging communications with the vehicle 830 to determine which vehicle will turn its headlights off. The communications may be exchanged using any suitable type of visible light communication (VLC) protocol. Stated succinctly, according to the present example, any of the vehicles 810 and 830 may use a segmented LED chip that is part of its headlights to both illuminate the road ahead of the vehicle and exchange communications with oncoming vehicles.

In some aspects, each of the vehicles 810 and 830 may include a transceiver that is separate from the vehicle's headlights, but still uses a segmented LED chip, such as the segmented LED chip 100, to transmit communications in a visible or non-visible light band. Using the segmented LED chip in this manner may be advantageous as emitter and detector LEDs in the segmented LED chip can be practically self-aligned as a result of the close spatial proximity between LEDs in the segmented LED chip. They can be placed in a very tight beam, without the expense of (periodic) alignment.

Figure 10A:
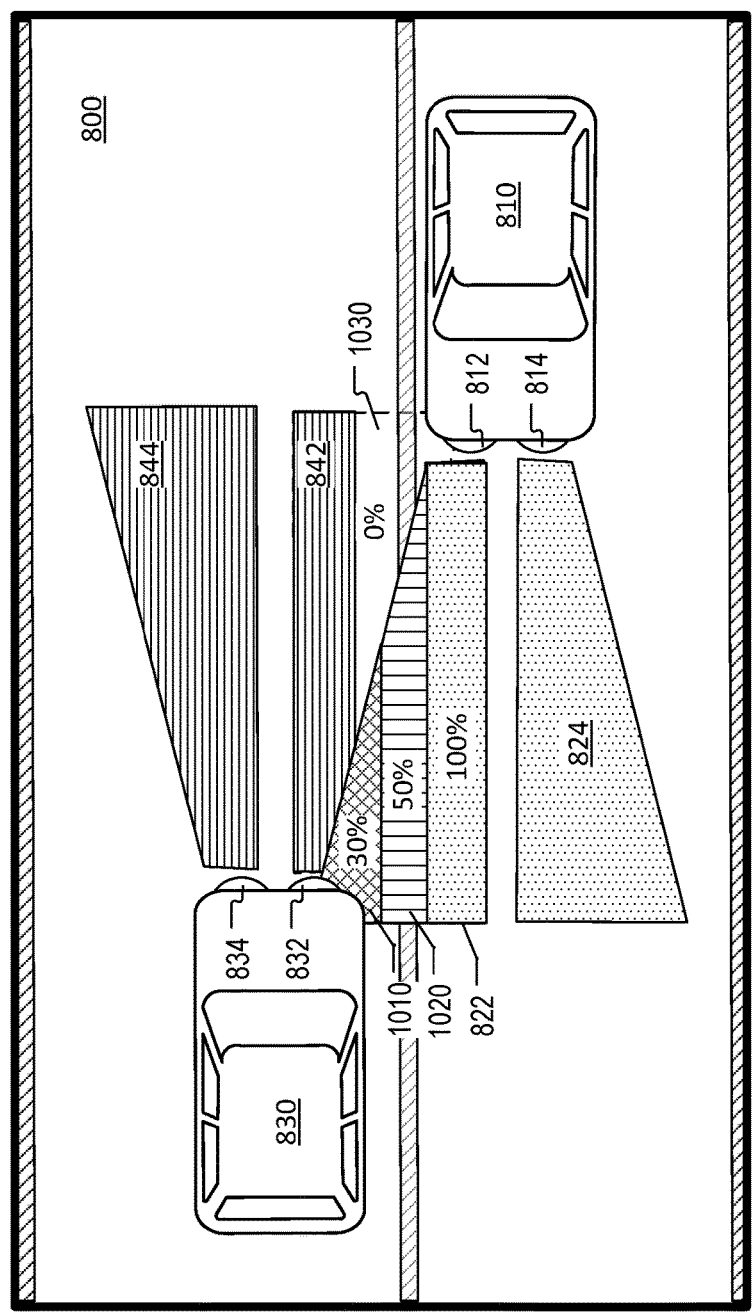
FIG. 10A is a diagram illustrating an example of another adaptive action that could be taken by the adaptive automotive lighting system of FIG. 8, according to aspects of the disclosure.

FIG. 10A is a diagram illustrating an example of another adaptive action that could be taken by the adaptive automotive lighting system of FIG. 8 when oncoming traffic is encountered, according to aspects of the disclosure. In this example, the headlight 812 of vehicle 810 uses at least one segmented LED chip to illuminate the road ahead of vehicle 810, such that different LEDs in the segmented LED chip are configured to illuminate different portions of the space 822. The use of the segmented LED chip permits vehicle 810 to turn down the brightness of only those LEDs that illuminate the space occupied by vehicle 830 (e.g., LEDs that might interfere with the vision of the driver of the vehicle 830). As illustrated, vehicle 810 may turn down the brightness of the LEDs illuminating a portion 1010 of the space 822 to 30% percent of the maximum brightness which they are capable of providing. Similarly, the vehicle 810 may turn down the brightness of the LEDs illuminating a portion 1020 of the space 822 to 50% of their maximum brightness. At the same time, the vehicle 810 may continue operating the remaining emitter LEDs in the headlight 814 at their full capacity, as shown. Furthermore, the vehicle 830 may completely turn off the LEDs in the headlight 832 that illuminate a portion 1030 of the space 842.

Figure 10B:
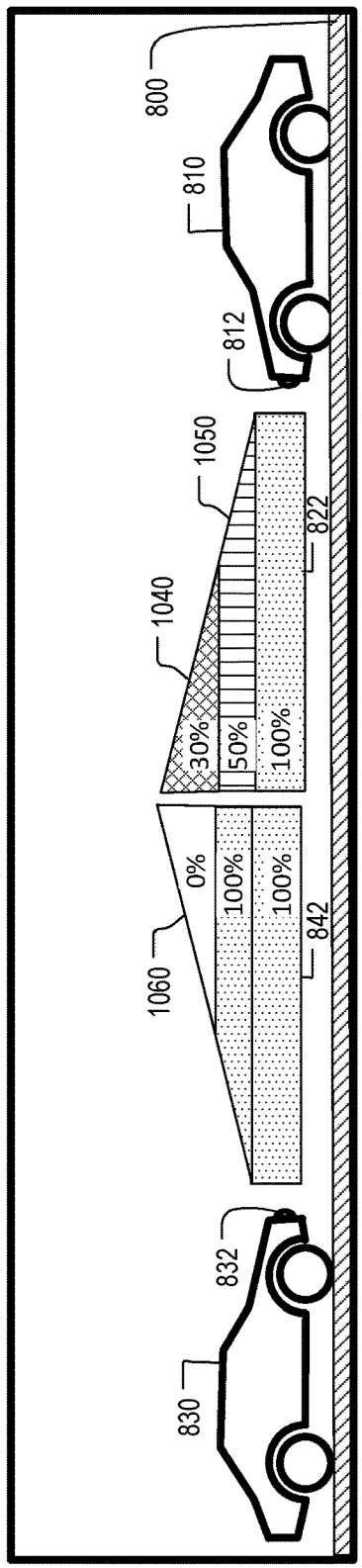
FIG. 10B is a diagram illustrating an example of another adaptive action that could be taken by the adaptive automotive lighting system of FIG. 8, according to aspects of the disclosure.

Although in the example of FIG. 10A the LEDs in headlights 812 and 832 are dimmed from side to side, in some implementations the LEDs in the headlights 812 and 832 may be dimmed from top to bottom instead. As illustrated in FIG. 10B, vehicle 810 may turn down the brightness of the LEDs in headlight 812 that illuminate a portion 1040 of the space 822 to 30% percent of the maximum brightness which they are capable of providing. Similarly, the vehicle 810 may turn down the brightness of the LEDs in headlight 812 that illuminate a portion 1050 of the space 822 to 50% of their maximum brightness. At the same time, the vehicle 810 may continue operating the remaining emitter LEDs in the headlight 812 at their full capacity, as shown. Furthermore, the vehicle 830 may completely turn off the LEDs in the headlight 832 that illuminate a portion 1060 of the space 842.

Additionally or alternatively, in some implementations, the headlights of vehicles 810 and 820 may be dimmed both from left to right and top to bottom. As noted above, the spaces 822 and 842 are three-dimensional. Accordingly, the brightness of the LED(s) in headlight 812 that illuminate any particular three-dimensional portion of the space 822 may be independently changed. Similarly, the brightness of the LEDs in headlight 832 that illuminate any particular three-dimensional portion of the space 842 may be independently changed, as well. As is further discussed below, this type of high granularity of adaptive lighting adjustment is made possible by the spatial proximity between emitter and detector LEDs on the segmented LED chip, which permits them to be aligned with the same optical element.

FIG. 11A is an exploded view of an example of the headlight 812, according to aspects of the disclosure. The headlight 812 includes a segmented LED chip 1110 and an optical unit 1120. The segmented LED chip 1110 includes a plurality of sections 1112, each of which includes at least one LED that is configured to operate as an emitter, and at least one other LED that is configured to operate as a detector. In some implementations, any section of the segmented LED chip 1110 may include multiple detector LEDs. Additionally or alternatively any section of the LED chip 1110 may include detector LEDs that have different respective absorption bands. For example, one or more sections of the segmented LED chip may include a first detector LED that is optimized to detect light emitted from halogen headlight, a second detector LED that is optimized to detect light emitted from xenon headlights, and a third LED that is optimized to detect light from incandescent headlights.

Each of the sections 1112 is aligned with a different optical element 1122 of the optical unit 1120. Each optical element 1122 may have a different central direction 1130, as shown in FIG. 11B. In some implementations, the optical unit 1120 may include a lens array and each of the optical elements 1122 may include a lens that is part of the array. Additionally or alternatively, the optical unit may include a plurality of apertures (e.g., barrels or lens barrels). Each aperture may be configured to guide light in a particular direction and/or receive light that is arriving at the aperture from the particular direction, while absorbing light that is incident on the aperture from other directions. Stated succinctly, each optical element of the optical unit 1220 may be any suitable type of device that is configured to guide light to/from a particular direction.

As discussed above, during the operation of the headlight 812, light from oncoming vehicle headlights is guided by the optical elements 1122 to impinge on detector LEDs that are located in the same section 1112 as the exact emitter LEDs that are illuminating the part of the road that is occupied by the oncoming vehicle. The detector LEDs will absorb wavelengths of the oncoming light that have energy greater than the bandgap within the detector LEDs active regions. The absorbed light in the detector LEDs will be converted into an electric current that passes to the electrical terminals of the detector LEDs. When biased appropriately, the amount of current is related to the amount of light that is incident on the detector LEDs, which could be related to the distance of the oncoming car. Thus, the emitter LEDs in a given section of the segmented LED chip 1110 may be dimmed in proportion to the amount light sensed by the detector LEDs in that section. If a greater amount of light is detected, the LEDs may be dimmed to a lower brightness level than if a lesser amount of light were to be detected. In some aspects, the emitter LEDs may be gradually dimmed as the oncoming vehicle gets closer to the headlight 812.

As noted above, the detector LEDs that sense light emitted from the headlights of oncoming vehicles are embedded in the same chip as the LEDs that emit light. As a result, the angles and/or regions that are illuminated by a given emitter LED can be made, by the optical unit 1120, to be the same as the angles/regions that a given detector LED located in the same section of the segmented LED chip 1110 is sensitive to. More particularly, according to aspects of the disclosure, only light incident from certain angles and/or regions will be incident on any given section of the segmented LED chip 1110. For any given section 1112 of the segmented LED chip 1110, light coming from the central direction 1130 of the given section's aligned optical element 1122 may be predominantly passed through the given section's aligned optical element 1122 to reach the given section. Similarly, light emitted by emitter LEDs in any given section 1112 of the segmented LED chip 1110 may be guided by the given section's aligned optical element in the optical element's central direction 1130.

As illustrated in FIG. 11B, an optical element 1122a is configured to guide light emanating from section 1112a of the segmented LED chip 1110 in a central direction 1130a. Similarly, the optical element 1122a is configured to guide light that is incident on the optical element 1122a from the central direction 1130a and (mostly) reflect and/or absorb light that is incident on the optical element 1122a from other directions. Thus, as a result of being aligned with the optical element 1122a, the section 1112a of the segmented LED chip 1110 is configured to receive light that is predominantly coming from the central direction 1130. Similarly, as a result of being aligned with the optical element 1122a, the section 1112a of the segmented LED chip 1110 is configured to emit light predominantly in the central direction 1130.

Furthermore, as illustrated in FIG. 11B, an optical element 1122b is configured to guide light emanating from section 1112b of the segmented LED chip 1110 in a central direction 1130b. Similarly, the optical element 1122b is configured to guide light that is incident on the optical element 1122b from the central direction 1130b and (mostly) reflect and/or absorb light that is incident on the optical element 1122b from other directions. Thus, as a result of being aligned with the optical element 1122b, the section 1112b of the segmented LED chip 1110 is configured to receive light that is predominantly coming from the central direction 1130b. Similarly, as a result of being aligned with the optical element 1122b, the section 1112b of the segmented LED chip 1110 is configured to emit light predominantly in the central direction 1130b.

Furthermore, as illustrated in FIG. 11B, an optical element 1122c is configured to guide light emanating from section 1112c of the segmented LED chip 1110 in a central direction 1130c. Similarly, the optical element 1122c is configured to guide light that is incident on the optical element 1122c from the central direction 1130c and (mostly) reflect and/or absorb light that is incident on the optical element 1122c from other directions. Thus, as a result of being aligned with the optical element 1122c, the section 1112c of the segmented LED chip 1110 is configured to receive light that is predominantly coming from the central direction 1130c. Similarly, as a result of being aligned with the optical element 1122b, the section 1112c of the segmented LED chip 1110 is configured to emit light predominantly in the central direction 1130c.

Stated succinctly, each of the optical elements 1122 may have a different central direction 1130, and each section 1112 of the segmented LED chip 1110 may be aligned with a different optical element 1122. As a result, each section of the segmented LED chip 1110 may be associated with a different portion of the space illuminated by the segmented LED chip 1110.

Figure 12:
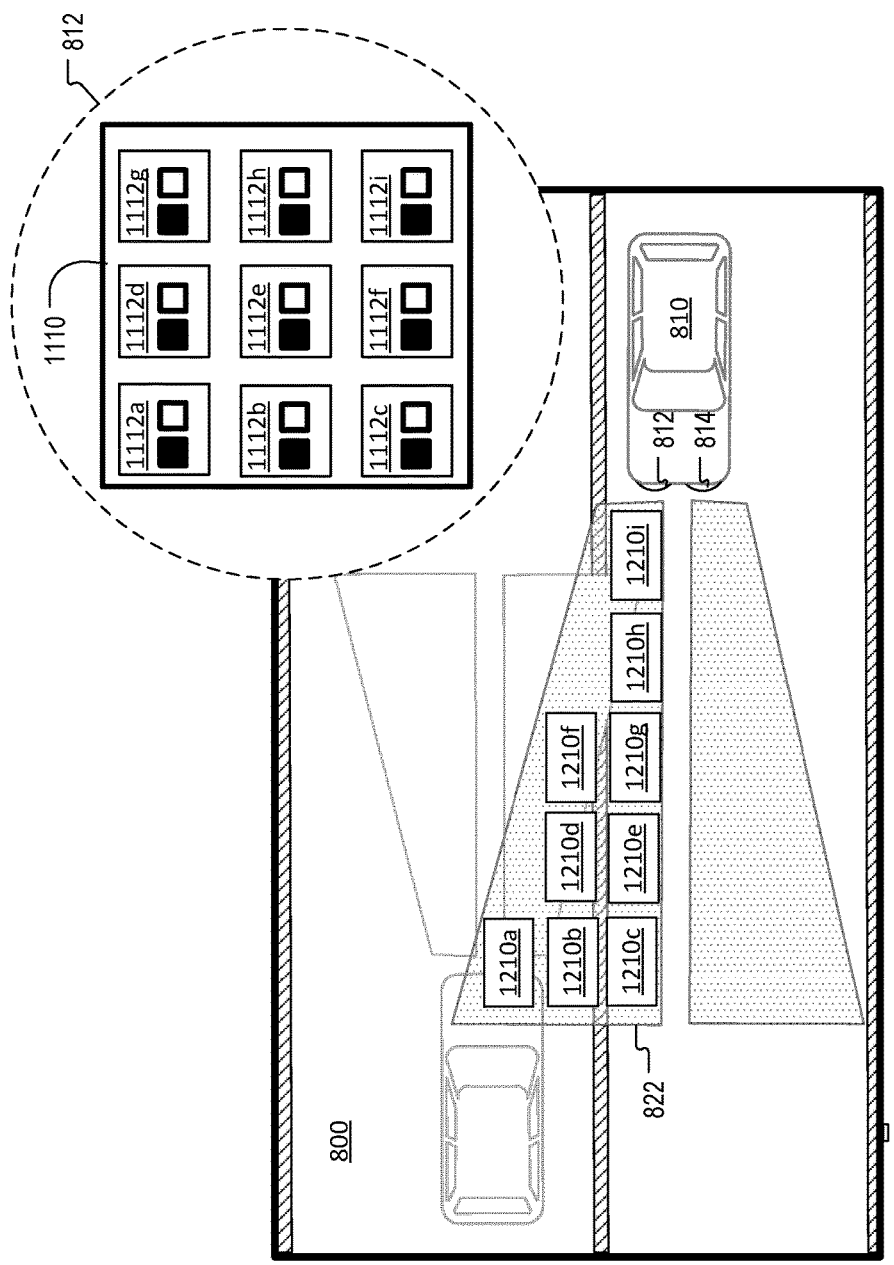
FIG. 12 is a diagram illustrating the operation of the headlight of FIG. 11A, according to aspects of the disclosure.

FIG. 12 is a schematic diagram illustrating the way light emitted from different sections of the segmented LED chip 1110 is guided by the optical unit 1120, according to aspects of the disclosure. As illustrated, the optical element 1122a causes light emitted from section 1112a to be directed to portion 1210a of the space 822. Similarly, the optical element 1122a causes light coming from the portion 1210a to be directed to the section 1112a. The optical element 1122b causes light emitted from section 1112b to be directed to portion 1210b of the space 822. Similarly, the optical element 1122b causes light coming from the portion 1210b to be directed to the section 1112b. The optical element 1122c causes light emitted from section 1112c to be directed to portion 1210c of the space 822. Similarly, the optical element 1122c causes light coming from the portion 1210c to be directed to the section 1112c. The optical element 1122d causes light emitted from section 1112d to be directed to portion 1210d of the space 822. Similarly, the optical element 1122d causes light coming from the portion 1210d to be directed to the section 1112d. The optical element 1122e causes light emitted from section 1112e to be directed to portion 1210e of the space 822. Similarly, the optical element 1122e causes light coming from the portion 1210e to be directed to the section 1112e. The optical element 1122f causes light emitted from section 1112f to be directed to portion 1210f of the space 822. Similarly, the optical element 1122f causes light coming from the portion 1210f to be directed to the section 1112f The optical element 1122g causes light emitted from section 1112g to be directed to portion 1210g of the space 822. Similarly, the optical element 1122g causes light coming from the portion 1210g to be directed to the section 1112g. The optical element 1122h causes light emitted from section 1112h to be directed to portion 1210h of the space 822. Similarly, the optical element 1122h causes light coming from the portion 1210h to be directed to the section 1112h. The optical element 1122i causes light emitted from section 1112i to be directed to portion 1210i of the space 822. Similarly, the optical element 1122i causes light coming from the portion 1210i to be directed to the section 1112i.

According to aspects of the disclosure, the emitter LEDs in any section of the segmented LED chip 1110 may be controlled only (or mostly) based on signals generated by detector LEDs in that section. This in turn may result in the brightness of the LEDs in any given section of the segmented LED chip 1110 being controlled based on the lighting conditions in the specific area (or space) illuminated by them. As discussed with respect to FIG. 10, this type of granular control over different portions of the segmented LED chip 1110 permits the adjustment of only those LEDs in the headlight 812 that impinge on oncoming traffic.

Although in the present example, the headlight 812 includes a single segmented LED chip, alternative implementations are possible in which multiple segmented LED chips are used. In such instances, each segmented LED chip may be aligned with a different optical element 1122 of the optical unit 1120. Furthermore, although in the present example the optical unit 1120 includes nine optical elements, alternative implementations are possible in which a different number of optical units is included in the optical unit (e.g., 2 optical units, 4 optical units, 5 optical units, etc.) Furthermore, the headlight 812 may include any suitable type of controller for driving the segmented LED chip 1110 or multiple LED chips that are part of the headlight 812. For example, the headlight 812 may include a controller such as the controller 620 or the controller 720.

According to aspects of the disclosure, the detector LEDs in the segmented LED chip 1110 may be susceptible to crosstalk. Crosstalk can occur when light emitted from the segmented LED chip 1110 is reflected by the optical unit 1120 (or another element of the headlight 812) back to the detector LEDs in the segmented LED chip 1110. The occurrence of crosstalk can compromise the sensitivity of the detector LEDs. Accordingly, to improve the detector LED's sensitivity to the incoming light, emitter LED(s) may be cyclically dimmed or shut off for a short period in which detector LED(s) are read. The period for which the emitter LEDs are dimmed or shut off can be shorter than the time-response of the human eye, making the dimming (or shutting off) imperceptible.

Figure 13:
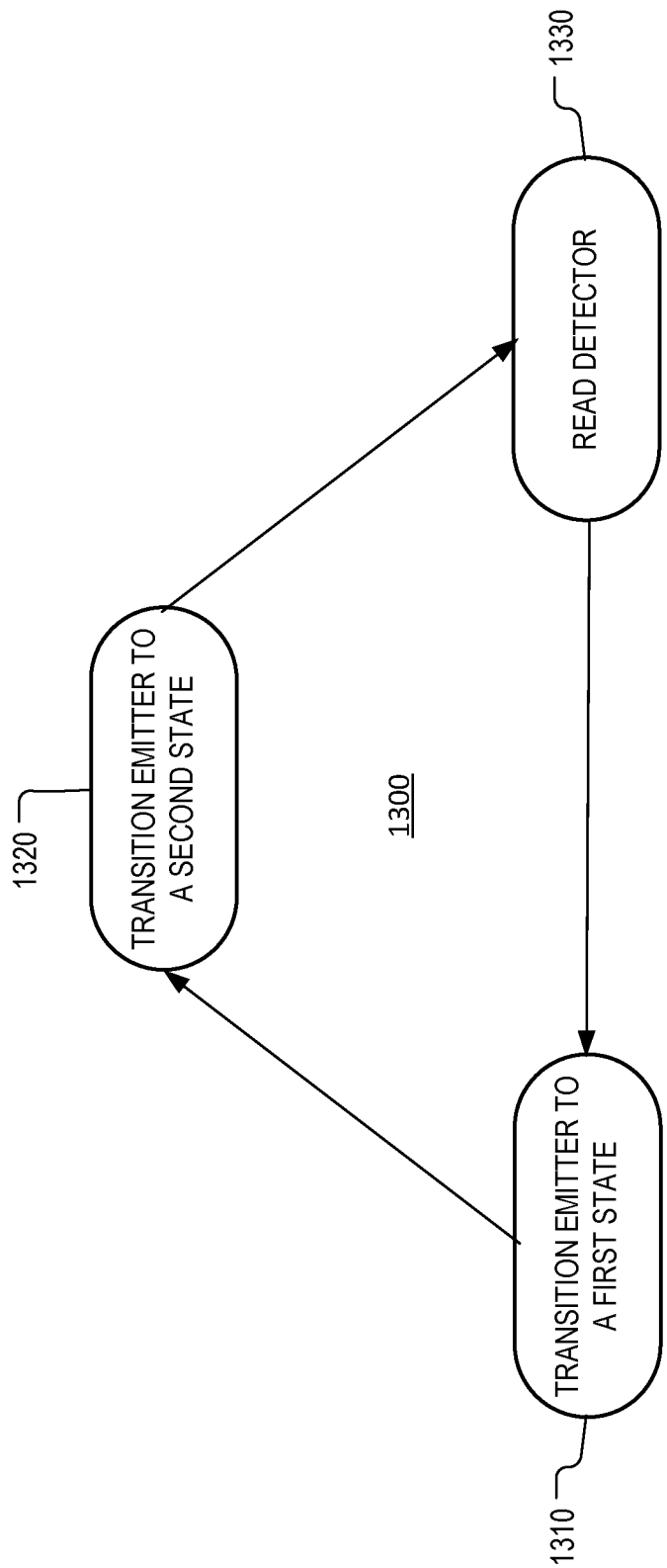
FIG. 13 is flowchart of an example of a process for avoiding crosstalk between emitter LEDs and reflector LEDs in a segmented LED chip, according to aspects of the disclosure.

FIG. 13 is flowchart of an example of a process 1300 for avoiding crosstalk between emitter LEDs and reflector LEDs in the segmented LED chip 1110, according to aspects of the disclosure. As illustrated, according to the process 1300, an emitter LED in the segmented LED chip 1110 is cycled between a first state (step 1310) and a second state (step 1320), while readings are taken from one or more designated detector LEDs that are located in the same section (or group) of the segmented LED chip 1110 only when the emitter LED is in the second state (step 1330).

In some implementations, the designated detector LEDs can be continuously operated as such. Additionally or alternatively, in some implementations, the one or more designated detector LEDs can be operated as emitters when the emitter LED is in the first state, and switched to detector mode, by changing the polarity of their respective biases, during periods in which the emitter LED is in the second state.

In some implementations, the second state of the emitter LED may coincide with the off-periods of a PWM wave used to drive the emitter LED. Additionally or alternatively, the second state may coincide with both on-periods and off-periods of the PWM wave. For example, the emitter LED may be in the first state when the PWM wave that drives the emitter LED has a first duty cycle. Furthermore, the emitter LED may be in the second state when the PWM wave that drives the emitter LED has a second duty cycle that is shorter than the first duty cycle. Stated succinctly, in some implementations, the emitter LED may be transitioned between the first state and the second state by varying the duty cycle of the PWM wave (and/or amount of current) that drives it. According to aspects of the disclosure, the first state of the emitter LED may be one in which the emitter LED is operating at a first brightness level (e.g., 100% of the emitters' maximum brightness, 80% of the emitters' maximum brightness, etc.) The second state of the emitter LED may be one in which the emitter LEDs are operating at a second brightness level that is lower than the first brightness level. For example, the second state may be one in which the emitter LED is switched off completely or a state in which the emitter LED is dimmed (e.g., operating at 40% of its maximum brightness). In some aspects, all emitters LEDs in the segmented LED chip 1110 (or another type of LED matrix) may be synchronously cycled between first and second states, as discussed, but the respective first states and/or the respective second states for emitter LEDs located in different sections (or groups) of the segmented LED chip 1110 may differ. For example, the emitter LEDs in one group (and/or chip section) may cycle between 80% and 40% brightness, while the emitter LEDs in another group (and/or chip section) may cycle between 70% and 40% brightness.

According to aspects of the disclosure, another type of crosstalk may occur when light emitted by one or more emitter LEDs in the segmented LED chip 1110 is directed towards neighboring LEDs. FIGS. 14A and 14B illustrate an example of a segmented LED chip 1400 that is optimized to avoid such crosstalk. More particularly, FIG. 14A is a top-down view of the segmented LED chip 1400, while FIG. 14B is a side view of the segmented LED chip 1400. The segmented LED chip 1400 includes a plurality of LEDs 1410 that are separated by trenches 1420. Inside the trenches 1420, a fence structure is formed that includes a plurality of cells. Inside each cell, a different LED 1410 is disposed, as shown. The walls of each cell may be taller than the LED that is enclosed in it, thus preventing light emitted by that LED from travelling sideways towards neighboring LEDs. In some aspects, the fence structure 1430 may be formed of any suitable material (e.g., glass, metal, etc.) with reflective coating, such as a metal (e.g., silver), dielectric distributed Bragg reflectors (DBRs) or silicone-based optical scattering matrix, for example. In some aspects, the fence structure 1430 may be formed by a combination of materials, such as a dielectric fence coated with a reflective metal, for example. In some implementations, the walls of each cell of the fence structure 1430 may be between 100% and 1000% of the height of the LED that is enclosed in it. The elements of the fence structure 1430 may be formed using any suitable type of process, such as plasma enhanced chemical vapor deposition, atomic layer deposition, evaporation deposition, sputtering deposition or silicone molding, for example.

Figure 15:
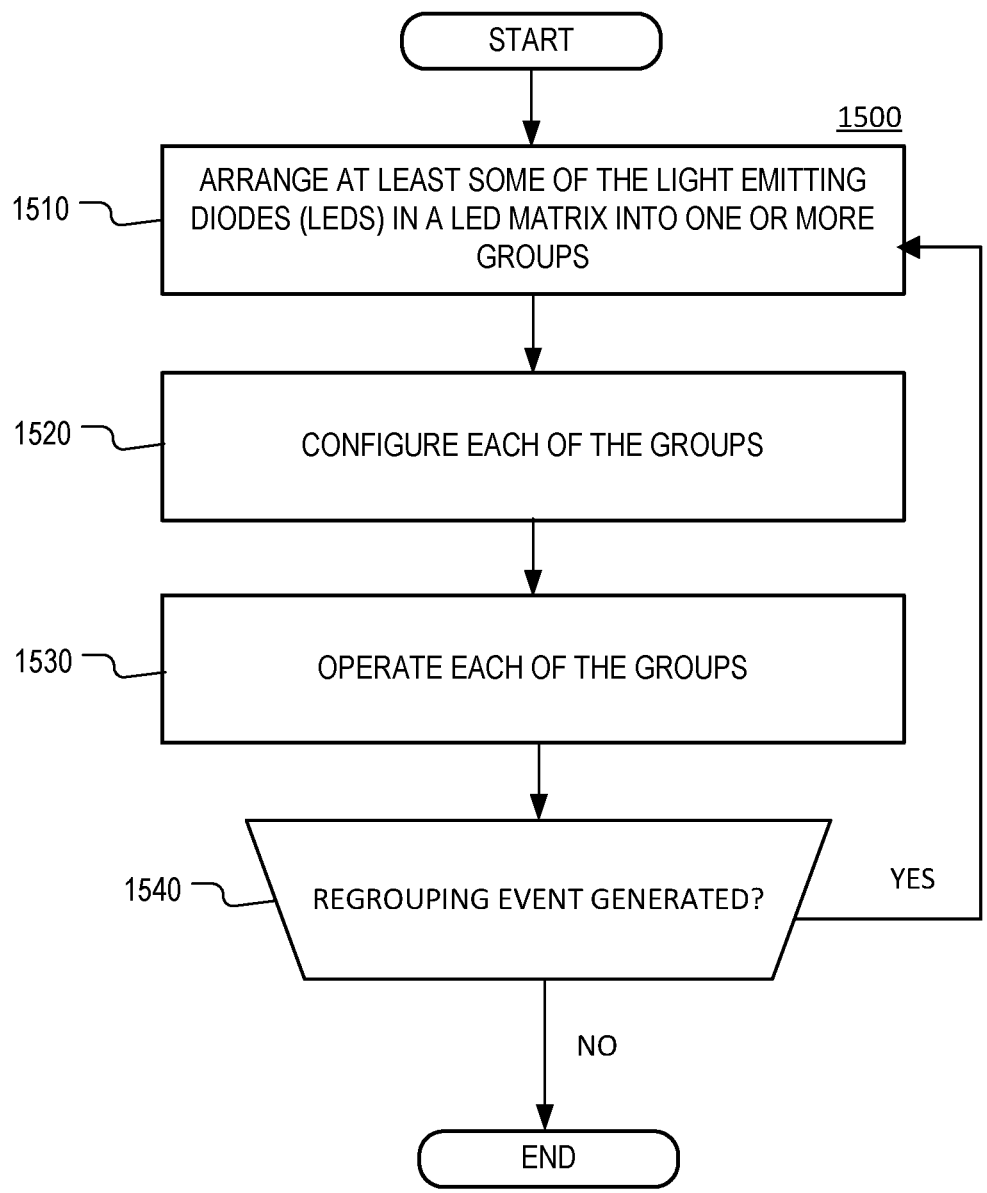
FIG. 15 is a flowchart of an example of a process for operating an LED matrix, according to aspects of the disclosure.

FIG. 15 is a flowchart of an example of a process 1500 for operating an LED matrix, according to aspects of the disclosure. The LED matrix may consist of a single segmented LED, or include multiple segmented LED chips, and/or include one or more non-segmented LED chips. The process 1500 may be performed by any suitable type of controller that is operatively coupled to the LED matrix.

At step 1510, a plurality of LEDs in the matrix is arranged into groups. In some implementations, arranging the LEDs into groups may include connecting each of the LEDs to one of a plurality of driver circuits. (E.g., see FIG. 6). Additionally or alternatively, arranging the LEDs into groups may include generating and storing in a memory a data structure identifying the groups. For example, the data structure may map an identifier of each group (e.g., E.g., "Group 1", "Group 2", etc.) to a list a of identifiers (e.g., addresses) of LEDs that are part of the group.

For instance, the data structure may be a table, as illustrated by Table 1, below:

TABLE 1

Data Structure Identifying a Plurality of LED Groups

| Group ID | LEDs in Group |
|---|---|
| Group 1 | (1,1), (1,2) (1,3), (2,1) |
| Group 2 | (2,2), (2,3), (3,1) |
| Group 3 | (3,2), (3,3) |

In the example of Table 1, each LED is identified by a double (X,Y) in which X is a column number and Y is a row number of the location of the LED in an LED matrix. Although in the present example, an X-Y coordinate is used to address the LEDs in the LED matrix, alternative implementations are possible in which any suitable type of alphanumeric identifier that corresponds to the LEDs' respective locations can be used instead. As discussed further below, in some implementations, the addresses may be used to identify LEDs in the matrix that are collocated.

At step 1520, the LEDs in each group are configured. According to aspects of the disclosure, configuring the LEDs in a given group may include applying one of a forward bias or a reverse bias to each of the LEDs in the given group, effectively causing each of the LEDs to operate as either an emitter LED or a detector LED. In some implementations, the magnitude of the bias applied to emitter and detector LEDs may be the same, and only the polarity may vary. Additionally or alternatively, in some implementations, the bias applied to detector LEDs may differ in both magnitude and polarity from the bias of the emitter LEDs. Additionally or alternatively, the magnitude of the bias applied to different emitter LEDs in a given group may be different. Additionally or alternatively, the magnitude of the bias applied to different emitter LEDs in a given group may be same. Additionally or alternatively, the magnitude of the bias applied to different detector LEDs in a given group may be different. Additionally or alternatively, the magnitude of the bias applied to different detector LEDs in a given group may be same.

Additionally or alternatively, configuring the LEDs in a given group may include identifying one or more LEDs in the group that are optimized to operate as detectors and applying a reverse bias to them. (E.g., see FIGS. 4 and 5.) In some implementations, the optimized LEDs may be identified based on a data structure stored the memory of the controller that identifies LEDs in the group that are optimized as receivers. In some implementations, the data structure may also identify a bias magnitude for each optimized LEDs as differently-doped LEDs may require different bias. In some implementations, each of the optimized LEDs may be biased in accordance with a corresponding bias magnitude that is specified in the data structure.

Additionally or alternatively, in some implementations, configuring the LEDs in a given group may include retrieving a data structure identifying a particular operational pattern and imparting that operational pattern on the given group by biasing the LEDs in the given group accordingly. In some aspects, the data structure may include a different identifier for each LED in the group that specifies the polarity of the bias to be applied to that LED. For example, the data structure may be a table, as shown below:

TABLE 2

A Data Structure Representing an Operational Pattern for a 3x3 LED matrix

| 0 | 0 | 0 |
|---|---|---|
| 0 | 1 | 0 |
| 0 | 0 | 0 |

According to the example of Table 2, the data structure may be a 3×3 matrix containing binary values, where 0 indicates that a forward bias is to be applied to a given LED, and "1" indicates that a reverse bias is to be applied. The data structure may be applied to any group of LEDs in which the LEDs are arranged in a 3×3 matrix, such that any value $i_{row, column}$ in the data structure specifies the bias of $LED_{row, column}$. In the present example, the value of $i_{2,2}$ in the data structure equals 1, which indicates that the LED located in row 2, column 2 is to be put in a reverse bias. Similarly, the value of $i_{1,1}$ in the data structure equals 0, which indicates that the LED located in row 1, column 1 is to be put in a forward bias. Although in the present example, the data structure identify only bias polarity, further implementations are possible in which the data structure identifies a respective bias magnitude for each LED in a matrix, or both.

At step 1530 each of the groups is operated to provide adaptive lighting to the area illuminated by that group. In some implementations, each of the group may be operated autonomously from the rest. Additionally or alternatively, in some implementations, each group may be operated in accordance with the process 1600, which is discussed with respect to FIG. 16 below.

At step 1540, a detection is performed of whether a regrouping event is generated. In some implementations, the regrouping event may be generated as a result of a user input. If a regrouping event is detected, the process 1500 returns to step 1510 and the LEDs are regrouped. According to aspects of the disclosure, regrouping the LEDs may include one or more of: (i) consolidating all LEDs into a single group, consolidating at least two existing groups into one, and/or dividing at least one existing group into multiple groups. In this regard, alternative implementations are possible in which all LEDs in the LED matrix are assigned to the same group. Furthermore, alternative implementations are possible, in which each of the groups consists of all LEDs found in a different segmented LED chip.

Figure 16:
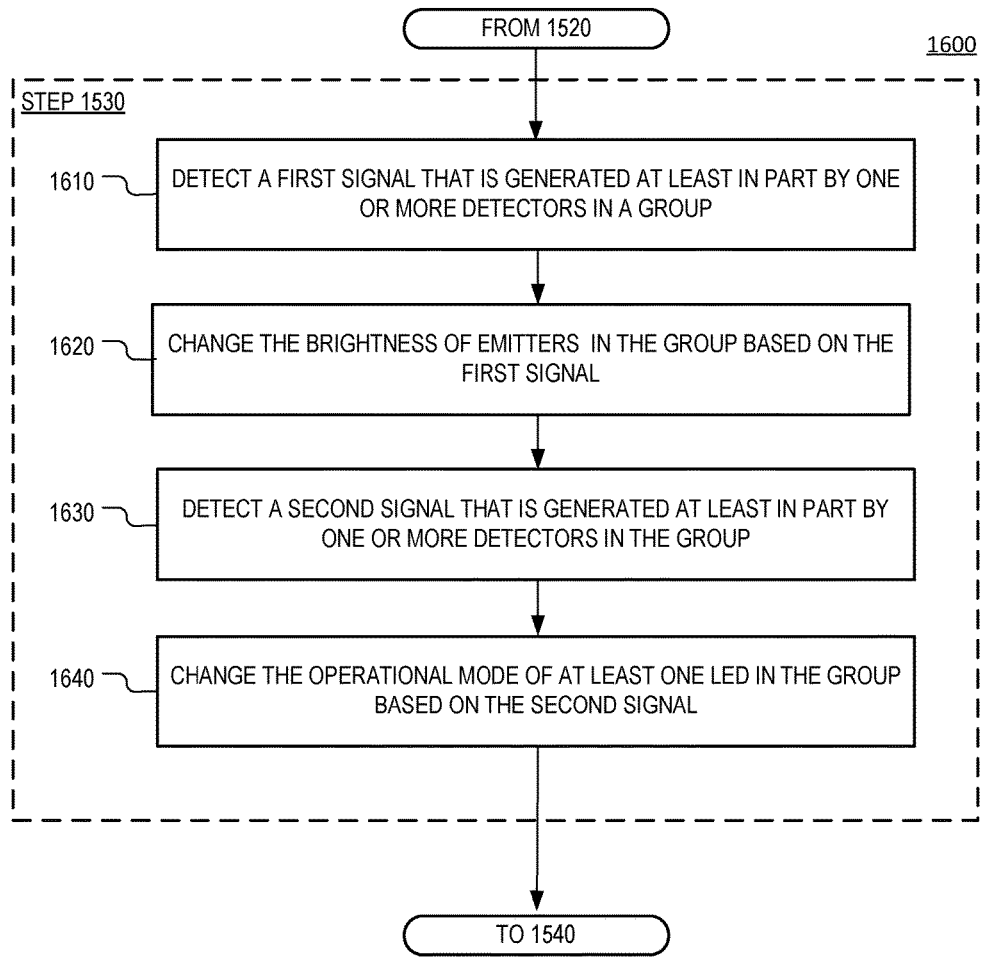
FIG. 16 is a flowchart of an example of a process for operating a group of LEDs in an LED matrix, according to aspects of the disclosure

FIG. 16 is a flowchart of an example of a process 1600 for operating a given group of LEDs, as discussed with respect to step 1530 of the process 1500, according to aspects of the disclosure. At step 1610, a first signal is generated at least in part by one or more detector LEDs in the given group. At step 1620, the brightness of the emitter LEDs in the group is changed based on the first signal. At step 1630, a second signal that is generated at least in part by one or more emitter LEDs in the given group is detected. At step 1640, the operational mode of at least one of the LEDs in the group is changed based on the second signal.

According to aspects of the disclosure, changing the operational mode of a given LED may include changing the bias of that LED from reverse to forward or from forward to reverse. For example, if a reverse bias is applied to an emitter LED, that LED may begin operating as a detector LED as a result. As another example, if a forward bias is applied to a detector LED, that LED may begin operating as an emitter LED.

In some implementations, step 1640 may be performed in response to the second signal having a characteristic that meets a predetermined threshold. For example, if the dynamic range of the second signal falls below a threshold, the bias of one or more emitter LEDs can be changed to increase the number of detector LEDs in the group and attain greater sensitivity. As another example, if the second signal indicates that the area at which the group of LEDs is directed is not illuminated sufficiently, the bias of a detector LED can be changed to add an extra emitter LED to the group.

In some implementations, the one or more detector LEDs in the group may be continuously operated as such. Alternatively, in some implementations, the one or more detector LEDs may be periodically switched from forward to reverse bias to take a reading, and then returned to forward bias. The switching of the bias polarity may occur very rapidly (e.g. <10 ns) to allow for light collection. In some implementations, the polarity of the bias of the one or more detector LEDs in the given group may be switched at a high frequency, so that the switching can be imperceptible to the human eye.

Figure 17:
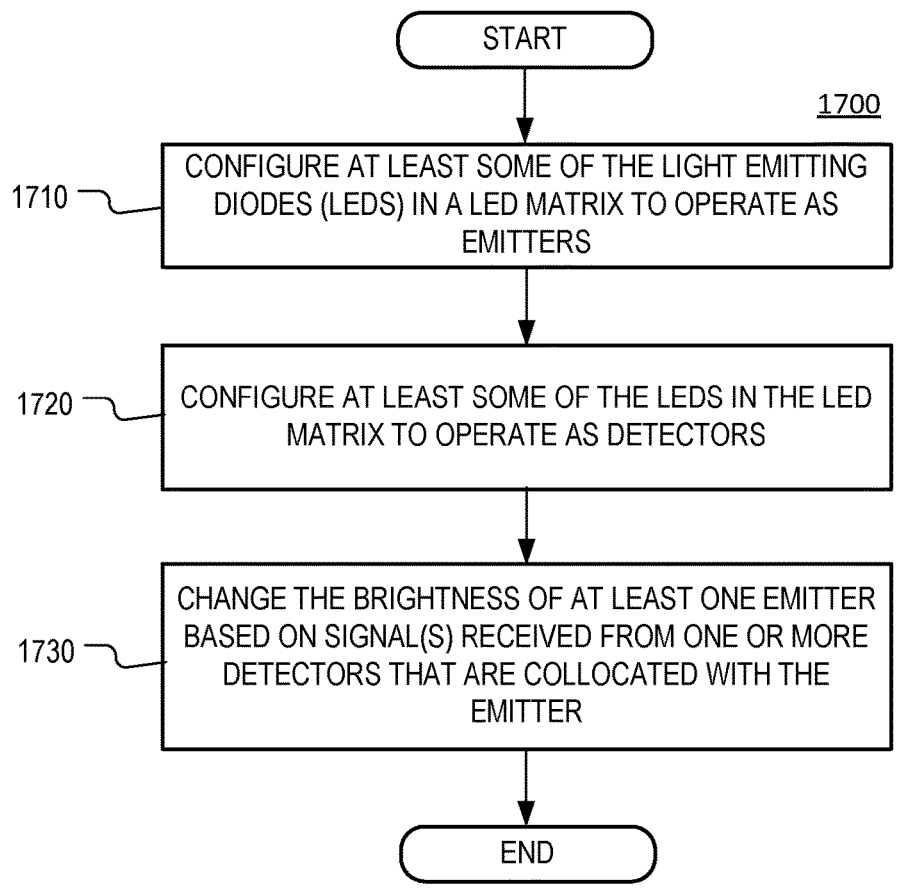
FIG. 17 is a flowchart of an example of a process for operating an LED matrix, according to aspects of the disclosure.

FIG. 17 is a flowchart of an example of a process 1700 for operating an LED matrix, according to aspects of the disclosure. The LED matrix may consist of a single segmented LED, or include multiple segmented LED chips, and/or include one or more non-segmented LED chips. The process 1700 may be performed by any suitable type of controller that is operatively coupled to the LED matrix.

At step 1710, at least some of the LEDs in a plurality are configured to operate as emitter LEDs by applying forward bias to them. At step 1720, the remaining ones of the plurality of LEDs are configured to operate as detector LEDs by applying a reverse bias to them.

At step 1730, the brightness of a given emitter LED in the matrix is changed based on a signal that is generated by one or more detector LEDs that are collocated with the given emitter LED. According to aspects of the disclosure, two LEDs may be collocated when they are in the same section of the LED matrix, such as a top-right quarter, top-left quarter, bottom-right quarter, or a bottom-left quarter, etc.

Additionally or alternatively, two LEDs may be collocated when they are within predetermined distance from one another in the LED matrix. In some implementations, the distance between a first LED and a second LED may equal the count of other LEDs that are situated along a straight line connecting the first LED and the second LED. For instance, if the first LED and the second LED are located next to each other, the distance may be zero. As another example, if there is one other LED between the first LED and the second LED, the distance between them may be 1. In some implementations, the distance between two LEDs may be determined based on the addresses of those LEDs.

Additionally or alternatively, in some implementations, two LEDs may be collocated if they are aligned with the same optical element. (E.g., see FIGS. 11A-B). Additionally or alternatively, in some implementations, two LEDs may be collocated if they are part of the same LED group. In some aspects, whether two LEDs are collocated may be determined based on a data structure stored in a memory of the controller of the LED matrix. The data structure may include a plurality of lists, wherein each list includes identifiers of the LEDs in a particular group. Additionally or alternatively, the data structure may include a plurality of lists, wherein each list includes identifiers of the LEDs that are aligned with a particular optical element in a larger optical unit. (E.g., see FIGS. 11A-B showing optical elements 1122 in the optical unit 1120.)

Although some of the concepts disclosed herein are presented in the context of adaptive automotive lighting, it will be understood that the disclosed segmented LED chip implementations, adaptive lighting system implementations, and processes for operating adaptive lighting systems can be employed in any context. For example, they can be used in indoor lighting systems, street lighting systems, stage lighting systems, decorative lighting systems, and greenhouse lighting systems. Thus, the disclosure is not limited to the examples presented herein.

FIGS. 1-17 are provided as an example only. At least some of the elements discussed with respect to these figures can be arranged in different order, combined, and/or altogether omitted. It will be understood that the provision of the examples described herein, as well as clauses phrased as "such as," "e.g.", "including", "in some aspects," "in some implementations," and the like should not be interpreted as limiting the disclosed subject matter to the specific examples.

Having described the invention in detail, those skilled in the art will appreciate that, given the present disclosure, modifications may be made to the invention without departing from the spirit of the inventive concepts described What is being claimed is:

1. An automotive headlight comprising:
 an optical unit including a plurality of optical elements, each optical element having a different central direction;
 a segmented light-emitting diode (LED) chip including a plurality of LEDs that are separated by trenches formed on the segmented LED chip and arranged in a plurality of sections, each section being aligned with a different respective optical element, and each section including at least one first LED and at least one second LED; and
 a controller configured to: apply a forward bias to each of the first LEDs, apply a reverse bias to each of the second LEDs, and change a brightness of the first LEDs in any section based on a signal generated by the second LED in that section.

2. The automotive headlight of claim 1, wherein aligning each of the sections in the LED chip with a different optical element causes each section of the segmented LED chip to be associated with a different portion of a space that is illuminated by the automotive headlight.

3. The automotive headlight of claim 1, wherein each section of the segmented LED chip is operable to receive light that is incident on the optical unit from the central direction of the respective optical element that is aligned with the section.

4. The automotive headlight of claim 1, wherein each section of the segmented LED chip is operable to emit light in the central direction of the respective optical element that is aligned with the section.

5. The automotive headlight of claim 1, wherein at least one optical element in the optical unit includes an aperture configured to guide light that is incident on the optical element from the optical element's central direction while absorbing light that is incident on the optical element from another direction.

6. The automotive headlight of claim 1, wherein at least one optical element in the optical unit includes a lens.

7. The automotive headlight of claim 1, wherein changing the brightness of the first LEDs includes one of dimming the first LEDs and turning off the first LEDs.

8. An automotive headlight comprising:
 an optical unit including a plurality of optical elements, each optical element having a different central direction;
 a segmented light-emitting diode (LED) chip including a plurality of LEDs that are separated by trenches formed on the segmented LED chip and arranged in a plurality of sections, each section being aligned with a different respective optical element in the optical unit, and each section including at least one first LED and at least one second LED; and
 a controller configured to: apply a forward bias to each of the first LEDs, apply a reverse bias to each of the second LEDs, detect light emitted from an oncoming vehicle by using one or more of the second LEDs, and execute an adaptive action in response to detecting the light emitted from the oncoming vehicle, the adaptive action including decreasing a brightness of a first section of the LED chip based on a signal that is generated by a respective second LED located in the first section, and decreasing a brightness of a second section of the LED chip based on a signal that is generated by a respective second LED located in the second section.

9. The automotive headlight of claim 8, wherein the brightness of the first section of the LED chip is decreased by a first amount, and the brightness of the second section of the LED chip is decreased by a second amount that is different from the first amount.

10. The automotive headlight of claim 8, wherein the controller is further configured to use one or more first LEDs in the LED chip to transmit a message for preventing a blinking condition from occurring, the message being transmitted to the oncoming vehicle by using a visible light communication (VLC) protocol.

11. The automotive headlight of claim 8, wherein each section of the segmented LED chip is operable to receive light that is incident on the optical unit from the central direction of the respective optical element that is aligned with the section.

12. The automotive headlight of claim 8, wherein each section of the segmented LED chip is operable to emit light in the central direction of the respective optical element that is aligned with the section.

13. The automotive headlight of claim 8, wherein at least one optical element in the optical unit includes an aperture configured to guide light that is incident on the optical element from the optical element's central direction while absorbing light that is incident on the optical element from another direction.

14. The automotive headlight of claim 8, wherein at least one optical element in the optical unit includes a lens.

15. An automotive headlight comprising:
 an optical unit including a plurality of optical elements, each optical element having a different central direction;
 a segmented light-emitting diode (LED) chip including a plurality of LEDs that are separated by trenches formed on the segmented LED chip and arranged in a plurality of sections, each section including at least one first LED and at least one second LED, each section being aligned with a different respective optical element in the optical unit; and
 a controller configured to: apply a forward bias to each of the first LEDs, apply a reverse bias to each of the second LEDs, detect light emitted from an oncoming vehicle by using one or more of the second LEDs, and execute an adaptive action in response to detecting the light emitted from the oncoming vehicle, the adaptive action including turning off the first LEDs in a first section of the LED chip, while keeping the first LEDs in a second section of the LED chip turned on, the first LEDs in the first section being turned off based on a signal that is generated by a respective second LED located in the first section.

16. The automotive headlight of claim 15, wherein aligning each of the sections in the LED chip with a different optical element causes each section of the segmented LED chip to be associated with a different portion of a space that is illuminated by the automotive headlight.

17. The automotive headlight of claim 15, wherein each section of the segmented LED chip is operable to receive light that is incident on the optical unit from the central direction of the respective optical element that is aligned with the section.

18. The automotive headlight of claim 15, wherein each section of the segmented LED chip is operable to emit light in the central direction of the respective optical element that is aligned with the section.

19. The automotive headlight of claim 15, wherein at least one optical element in the optical unit includes an aperture configured to guide light that is incident on the optical element from the optical element's central direction while absorbing light that is incident on the optical element from another direction.

20. The automotive headlight of claim 15, wherein at least one optical element in the optical unit includes a lens.

\* \* \* \* \*